(12) United States Patent
Almquist et al.

(10) Patent No.: US 12,003,455 B2
(45) Date of Patent: Jun. 4, 2024

(54) INTRA-SYMBOL OCC MAPPING FOR TRANSMISSIONS SUCH AS NR-U PUCCH TRANSMISSIONS

(71) Applicant: Telefonaktiebolaget LM Ericsson (publ), Stockholm (SE)

(72) Inventors: Gustav Almquist, Järfälla (SE); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 599 days.

(21) Appl. No.: 17/266,764

(22) PCT Filed: Aug. 7, 2019

(86) PCT No.: PCT/IB2019/056736
§ 371 (c)(1),
(2) Date: Feb. 8, 2021

(87) PCT Pub. No.: WO2020/031118
PCT Pub. Date: Feb. 13, 2020

(65) Prior Publication Data
US 2021/0298009 A1    Sep. 23, 2021

Related U.S. Application Data

(60) Provisional application No. 62/716,693, filed on Aug. 9, 2018.

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/0007* (2013.01); *H04L 27/2602* (2013.01);
(Continued)

(58) Field of Classification Search
None
See application file for complete search history.

(56) References Cited

U.S. PATENT DOCUMENTS 10,945,237 B2 *   3/2021   Yi .......................... H04W 72/04
11,375,527 B1 *   6/2022   Eyuboglu .......... H04B 7/15528
(Continued)

OTHER PUBLICATIONS

Author Unknown, "Technical Specification Group Radio Access Network; NR; Physical channels and modulation (Release 15)," Technical Specification 38.211, Version 15.2.0, 3GPP Organizational Partners, Jun. 2018, 93 pages.
(Continued)

*Primary Examiner* — Phirin Sam
(74) *Attorney, Agent, or Firm* — Withrow & Terranova, PLLC

(57) ABSTRACT

Systems and methods are disclosed herein for intra-symbol Orthogonal Cover Code (OCC) mapping for transmissions such as, e.g., New Radio-Unlicensed (NR-U) Physical Uplink Control Channel (PUCCH) transmissions. In this regard, embodiments of a method performed by a wireless device and corresponding embodiments of a wireless device are disclosed. In some embodiments, a method performed by a wireless device comprises selecting a repetition mapping for In-Phase/Quadrature-Phase (I/Q) symbol repetitions within an Orthogonal Frequency Division Multiplexing (OFDM) or Discrete Fourier Transform spread OFDM (DFT-s-OFDM) symbol of an uplink transmission. The I/Q symbol repetitions are for application of an intra data symbol OCC to the I/Q symbol repetitions. The method further comprises transmitting an uplink transmission using the selected repetition mapping. In this manner, performance is improved. Embodiments of a method of operation of a base station and corresponding embodiments of a base station are also disclosed.

23 Claims, 19 Drawing Sheets

(51) Int. Cl.
    *H04W 16/14*     (2009.01)
    *H04W 72/21*     (2023.01)
(52) U.S. Cl.
    CPC ........... *H04W 16/14* (2013.01); *H04W 72/21* (2023.01); *H04L 5/0051* (2013.01)

(56) References Cited

U.S. PATENT DOCUMENTS

| | | | | |
|---|---|---|---|---|
| 2009/0004984 | A1* | 1/2009 | Chrabieh | H04L 5/0044 455/205 |
| 2011/0122919 | A1* | 5/2011 | Levita | H04B 1/7183 375/E1.001 |
| 2014/0072307 | A1* | 3/2014 | Zamani | H04L 27/2647 398/79 |
| 2015/0215083 | A1* | 7/2015 | Han | H04L 1/1812 370/329 |
| 2017/0164352 | A1 | 6/2017 | Yang et al. | |
| 2018/0159655 | A1* | 6/2018 | Papasakellariou | H04L 1/1819 |
| 2020/0178258 | A1* | 6/2020 | Park | H04L 1/08 |
| 2020/0220658 | A1* | 7/2020 | Beale | H04L 27/2621 |
| 2021/0022117 | A1* | 1/2021 | Yi | H04L 5/0044 |

OTHER PUBLICATIONS

Author Unknown, "Technical Specification Group Radio Access Network; NR; Multiplexing and channel coding (Release 15)," Technical Specification 38.212, Version 15.2.0, 3GPP Organizational Partners, Jun. 2018, 98 pages.

Ericsson, "R1-1806261: NR-U PUCCH Design," Third Generation Partnership Project (3GPP), TSG-RAN WG1 Meeting #93, May 21-25, 2018, 6 pages, Busan, Korea.

Ericsson, "R1-1809203: On UL signals and channels, " Third Generation Partnership Project (3GPP), TSG-RAN WG1 Meeting #94, Aug. 20-24, 2018, 20 pages, Gothenburg, Sweden.

Motorola, "R1-060385: Cubic Metric in 3GPP-LTE," Third Generation Partnership Project (3GPP), TSG RAN WG1 #44, Feb. 13-17, 2006, 7 pages, Denver, USA.

International Search Report and Written Opinion for International Patent Application No. PCT/IB2019/056736, dated Dec. 18, 2019, 17 pages.

Ericsson, "NR-U PUCCH Design", 3GPP Draft; R1-1806261 NR-U PUCCH Design, 3rd Generation Partnership Project (3GPP), Mobile Competence Centre ; 650, Route Des Lucioles ; F-06921 Sophia-Antipolis Cedex ; France, vol. RAN WG1, No. Busan, Korea; May 21, 2018-May 25, 2018 May 20, 2018 (May 20, 2018), XP051441469.

Ericsson, "On UL signals and channels", 3GPP Draft; R1-1809203 On UL Signals and Channels, 3rd Generation Partnership Project (3GPP), Mobile Competence Centre ; 650, Route Des Lucioles ; F-06921 Sophia-Antipolis Cedex ; France, vol. RAN WG1, No. Gothenburg, Sweden; Aug. 20, 2018-Aug. 24, 2018 Aug. 11, 2018.

Motorola, "Cubic Metric in 3GPP-LTE", 3GPP TSG RAN WG1 #44, R1-060385, Denver, USA, Feb. 13-17, 2006.

\* cited by examiner

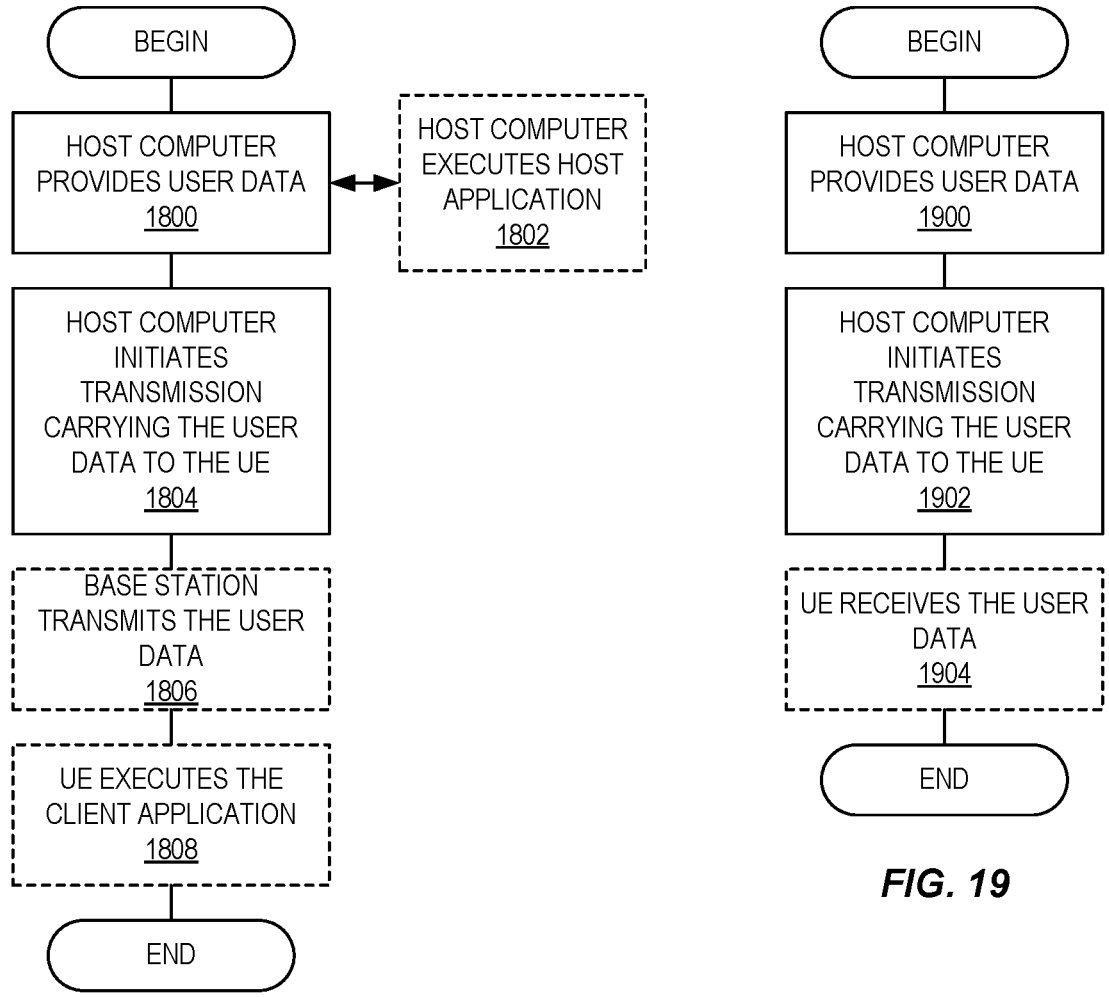

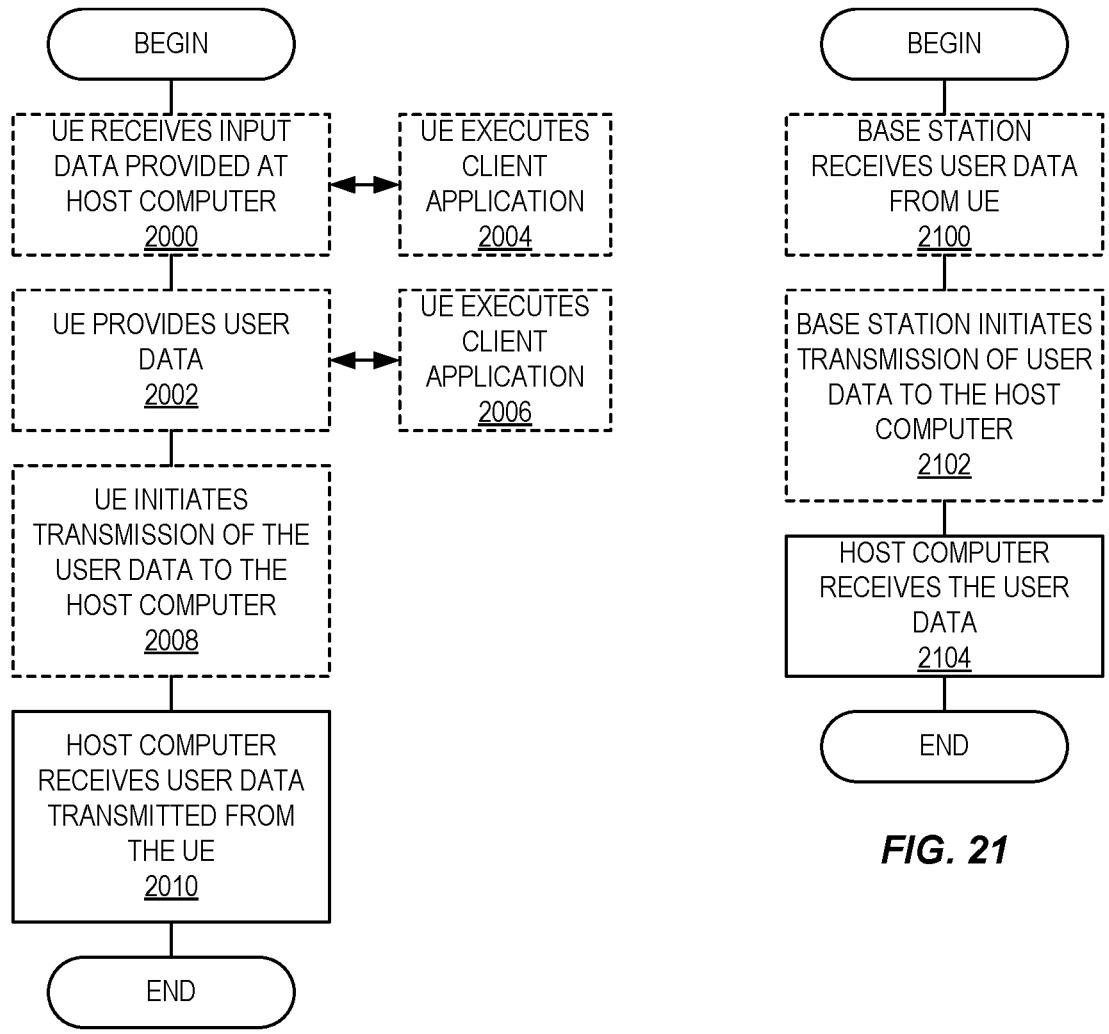

INTRA-SYMBOL OCC MAPPING FOR TRANSMISSIONS SUCH AS NR-U PUCCH TRANSMISSIONS

RELATED APPLICATIONS

This application is a 35 U.S.C. § 371 national phase filing of International Application No. PCT/IB2019/056736, filed Aug. 7, 2019, which claims the benefit of provisional patent application Ser. No. 62/716,693, filed Aug. 9, 2018, the disclosures of which are hereby incorporated herein by reference in their entireties.

TECHNICAL FIELD

The present disclosure relates to multiplexing using Orthogonal Cover Codes (OCCs) in a wireless system and, more specifically, intra-symbol OCC mapping.

BACKGROUND

The New Radio (NR) standard in Third Generation Partnership Project (3GPP) is being designed to provide service for multiple use cases such as enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC, or other services.

FIG. 1 illustrates an exemplary radio resource in NR.

In Release (Rel) 15 NR, a User Equipment device (UE) can be configured with up to four carrier Bandwidth Parts (BWPs) in the downlink with a single downlink carrier BWP being active at a given time. A UE can be configured with up to four carrier BWPs in the uplink with a single uplink carrier BWP being active at a given time. If a UE is configured with a supplementary uplink, the UE can in addition be configured with up to four carrier BWPs in the supplementary uplink with a single supplementary uplink carrier BWP being active at a given time.

For a carrier BWP with a given numerology $\mu_i$, a contiguous set of Physical Resource Blocks (PRBs) are defined and numbered from 0 to $N_{BWP,i}^{size}-1$, where i is the index of the carrier BWP. A Resource Block (RB) is defined as 12 consecutive subcarriers in the frequency domain.

Multiple OFDM numerologies, y, are supported in NR as given by Table 1, where the subcarrier spacing, $\Delta f$, and the Cyclic Prefix (CP) for a carrier BWP are configured by different higher layer parameters for downlink and uplink, respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. The following downlink physical channels are defined:
 Physical Downlink Shared Channel (PDSCH)
 Physical Broadcast Channel (PBCH)
 Physical Downlink Control Channel (PDCCH)
PDSCH is the main physical channel used for unicast downlink data transmission, but also for transmission of Random Access Response (RAR), certain system information blocks, and paging information. PBCH carries the basic system information required by the UE to access the network. PDCCH is used for transmitting Downlink Control Information (DCI), mainly scheduling decisions, required for reception of PDSCH, and for uplink scheduling grants enabling transmission on Physical Uplink Shared Channel (PUSCH).

An uplink physical channel corresponds to a set of resource elements carrying information originating from higher layers. The following uplink physical channels are defined:
 PUSCH
 Physical Uplink Control Channel (PUCCH)
 Physical Random Access Channel (PRACH)
PUSCH is the uplink counterpart to the PDSCH. PUCCH is used by UEs to transmit uplink control information, including Hybrid Automatic Repeat Request (HARQ) acknowledgements, channel state information reports, etc. PRACH is used for random access preamble transmission.

In general, a UE shall determine the RB assignment in the frequency domain for PUSCH or PDSCH using the resource allocation field in the detected DCI carried in PDCCH. For PUSCH carrying msg3 in a random access procedure, the frequency domain resource assignment is signaled by using the uplink grant contained in RAR.

In NR, two frequency resource allocation schemes, type 0 and type 1, are supported for PUSCH and PDSCH. Which type to use for a PUSCH/PDSCH transmission is either defined by a Radio Resource Control (RRC) configured parameter or indicated directly in the corresponding DCI or uplink grant in RAR (for which type 1 is used).

The RB indexing for uplink/downlink type 0 and type 1 resource allocation is determined within the UE's active carrier BWP, and the UE shall upon detection of PDCCH intended for the UE determine first the uplink/downlink carrier BWP and then the resource allocation within the carrier BWP. The uplink BWP for PUSCH carrying msg3 is configured by higher layer parameters.

For cell search and initial access, these channels are included: Synchronization Signal (SS)/PBCH block, PDSCH carrying Remaining Minimum System Information (RMSI)/RAR/msg4 scheduled by PDCCH channels carrying DCI, and PRACH channels and PUSCH channels carrying msg3.

The SS and PBCH block (SS/PBCH block, or SSB in shorter format) comprises the above signals (Primary Synchronization Signal (PSS), Secondary Synchronization Signal (SSS), and PBCH Demodulation Reference Signal (DMRS)), and PBCH. The SSB may have 15 kilohertz (kHz), 30 kHz, 120 kHz, or 240 kHz Smaller Subcarrier Spacing (SCS) depending on the frequency range.

NR-Unlicensed (NR-U) is being studied in 3GPP to bring NR to the unlicensed bands. Two requirements are commonly found in regulations for operation in unlicensed spectrum: (1) occupied channel bandwidth, and (2) maximum Power Spectral Density (PSD). The occupied bandwidth requirement states that the transmitted signal power occupies a large portion of the declared Nominal Channel Bandwidth. Maximum PSD requirements exist in many different regions. The implication of the PSD requirement is that without a proper physical layer signal design, a signal with small transmission bandwidth will be limited in transmission power. This can negatively affect coverage.

This can be solved by introducing frequency domain interlaced transmissions in the uplink, i.e. that multiple PRBs spread over the available bandwidth are used. This allows a UE to transmit with higher power (and, to a lesser extent, to satisfy the occupied channel bandwidth requirement) even when the scheduled bandwidth need is small. It is expected that NR will adopt a similar design philosophy to support unlicensed operations.

There currently exist certain challenge(s). The design of the PUCCH is not complete for NR-U. The methods and configurations for the design are still not decided. Designing an appropriate PUCCH is very important for the functionality of the entire NR-U.

SUMMARY

Systems and methods are disclosed herein for intra-symbol Orthogonal Cover Code (OCC) mapping for transmissions such as, e.g., New Radio-Unlicensed (NR-U) Physical Uplink Control Channel (PUCCH) transmissions. In this regard, embodiments of a method performed by a wireless device are disclosed. In some embodiments, a method performed by a wireless device comprises selecting a repetition mapping for In-Phase/Quadrature-Phase (I/Q) symbol repetitions within an Orthogonal Frequency Division Multiplexing (OFDM) or Discrete Fourier Transform spread OFDM (DFT-s-OFDM) symbol of an uplink transmission. The I/Q symbol repetitions are for application of an intra data symbol OCC to the I/Q symbol repetitions. The method further comprises transmitting an uplink transmission using the selected repetition mapping. In this manner, performance is improved.

In some embodiments, the uplink transmission is a physical uplink channel transmission in an unlicensed spectrum. In some embodiments, the uplink transmission is an NR-U physical uplink channel transmission.

In some embodiments, the OFDM or DFT-s-OFDM symbol is an OFDM symbol, and selecting the repetition mapping for the I/Q symbol repetitions comprises selecting a symbol repetition mapping as the repetition mapping for the I/Q symbol repetitions within the OFDM symbol of the uplink transmission.

In some embodiments, the OFDM or DFT-s-OFDM symbol is an OFDM symbol, and selecting the repetition mapping for the I/Q symbol repetitions comprises selecting a block repetition mapping as the repetition mapping for the I/Q symbol repetitions within the OFDM symbol of the uplink transmission.

In some embodiments, the OFDM or DFT-s-OFDM symbol is a DFT-s-OFDM symbol, and selecting the repetition mapping for the I/Q symbol repetitions comprises selecting a block repetition mapping as the repetition mapping for the I/Q symbol repetitions within the OFDM symbol of the uplink transmission.

In some embodiments, the OFDM or DFT-s-OFDM symbol is a DFT-s-OFDM symbol, and selecting the repetition mapping for the I/Q symbol repetitions comprises selecting a symbol repetition mapping as the repetition mapping for the I/Q symbol repetitions within the OFDM symbol of the uplink transmission.

In some embodiments, the uplink transmission is a PUCCH transmission.

In some embodiments, the I/Q symbol repetitions are within a single Physical Resource Block (PRB). In some embodiments, the I/Q symbol repetitions are within two or more PRBs.

In some embodiments, the I/Q symbol repetitions are repetitions of one or more I/Q data symbols. In some embodiments, the I/Q symbol repetitions are repetitions of one or more I/Q symbols other than data symbols (e.g., Demodulation Reference Signal (DMRS) symbols.

In some embodiments, selecting the repetition mapping for I/Q symbol repetitions comprises selecting the repetition mapping for the I/Q symbol repetitions based on either or both of: a coderate or a payload size.

In some embodiments, the intra data symbol OCC is cycled over the frequency domain.

In some embodiments, the intra data symbol OCC is cycled over the frequency domain such that different OCCs are used for different subsets of a frequency range. In some embodiments, the different OCCs used for different subsets of a frequency range for a first User Equipment (UE) are orthogonal to the OCCs for a second UE in each subset of the frequency range.

Embodiments of a wireless device are also disclosed. In some embodiments, a wireless device for a cellular communications network is adapted to select a repetition mapping for I/Q symbol repetitions within an OFDM or DFT-s-OFDM symbol of an uplink transmission. The I/Q symbol repetitions are for application of an intra data symbol OCC to the I/Q symbol repetitions. The wireless device is further adapted to transmit an uplink transmission using the selected repetition mapping.

Embodiments of a method performed by a base station are also disclosed. In some embodiments, a method performed by a base station comprises providing, to a wireless device, information that either: (a) instructs the wireless device to use a particular repetition mapping for I/Q symbol repetitions within an OFDM or DFT-s-OFDM symbol of an uplink transmission, the I/Q symbol repetitions being for application of an intra data symbol OCC to the I/Q symbol repetitions; or (b) assists the wireless device with selection of a particular repetition mapping for I/Q symbol repetitions within an OFDM or DFT-s-OFDM symbol of an uplink transmission, the I/Q symbol repetitions being for application of an intra data symbol OCC to the I/Q symbol repetitions.

In some embodiments, the information comprises an instruction or configuration that instructs the wireless device to use a particular one of two or more predefined repetition mappings.

Embodiments of a base station are also disclosed. In some embodiments, a base station for a cellular communications network is adapted to provide, to a wireless device, information that either: (a) instructs the wireless device to use a particular repetition mapping for I/Q symbol repetitions within an OFDM or DFT-s-OFDM symbol of an uplink transmission, the I/Q symbol repetitions being for application of an intra data symbol OCC to the I/Q symbol repetitions; or (b) assists the wireless device with selection of a particular repetition mapping for I/Q symbol repetitions within an OFDM or DFT-s-OFDM symbol of an uplink transmission, the I/Q symbol repetitions being for application of an intra data symbol OCC to the I/Q symbol repetitions.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 18 through 21 are flowcharts illustrating methods implemented in a communication system, in accordance with some embodiment of the present disclosure.

DETAILED DESCRIPTION

Figure 1:
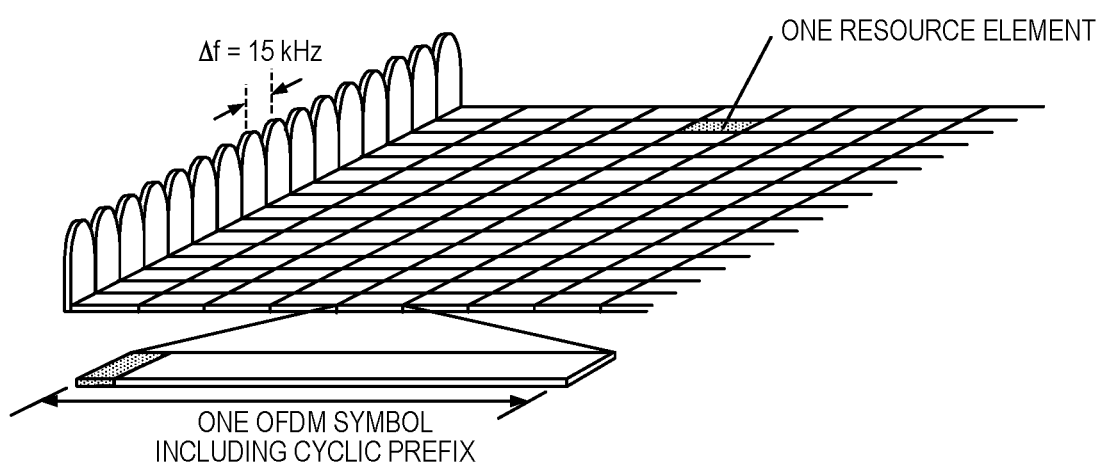
FIG. 1 illustrates an exemplary radio resource in New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a NR base station (gNB) in a 3GPP Fifth Generation (5G) NR network or an enhanced or evolved Node B (eNB) in a 3GPP Long Term Evolution (LTE) network), a high-power or macro base station, a low-power base station (e.g., a micro base station, a pico base station, a home enhanced or evolved Node B (eNB), or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a Third Generation Partnership Project (3GPP) network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to Fifth Generation (5G) New Radio (NR) concepts, beams may be used instead of cells and, as such, it is important to note that the concepts described herein are equally applicable to both cells and beams.

As discussed above, the design of the Physical Uplink Control Channel (PUCCH) is not complete for New Radio-Unlicensed (NR-U). The methods and configurations for the design are still not decided. Designing an appropriate PUCCH is very important for the functionality of the entire NR-U.

Certain aspects of the present disclosure and their embodiments may provide solutions to the aforementioned or other challenges. Orthogonal Cover Codes (OCCs) are used to allow multiplexing of multiple UEs on the same physical resource. The performance and cubic metric of a PUCCH based on intra data symbol OCC can be optimized by selecting different mappings of how to repeat the data on which to apply the OCC. Two waveforms are considered, namely, Orthogonal Frequency Division Multiplexing (OFDM) and Discrete Fourier Transform (DFT) spread OFDM (DFT-s-OFDM).

In some embodiments, systems and methods for selecting an appropriate symbol repetition mapping for intra data symbol OCC depending on the other properties of the PUCCH for NR-U are disclosed.

Certain embodiments may provide one or more of the following technical advantage(s). For example, certain embodiments provide increased performance of a potential solution for the NR-U PUCCH.

In NR-U, the uplink transmission will be spread over multiple Physical Resource Blocks (PRBs) to satisfy the requirements for unlicensed band operation. For example, the PUCCH could be made to cover 10 PRBs instead of for example 1 PRB used in NR. Thus, in this case, the multiplexing capacity is reduced by 90%. One way to improve the multiplexing capacity is to use an intra data symbol OCC. Some or all the modulated In-Phase/Quadrature-Phase (I/Q) data symbols will then be repeated over the available subcarriers. An OCC code, drawn from a set of in this context orthogonal codes, is then applied over these repetitions. In a receiver, the same code is applied again but conjugated, and the repeated symbols are combined cancelling out any user using any of the other OCC codes in the set. The result is that the desired user can be isolated from the interfering users.

The present disclosure provides different ways to repeat the modulated I/Q data symbols in the frequency domain, which are referred to herein as different repetition mappings. It has been observed that different mappings give different performance and cubic metrics. Performance in this case is defined as the Signal to Noise Ratio (SNR), or transmission power, required to achieve the operating point defined by a probability that an Acknowledgement (ACK) is received as something other than an ACK must be lower than or equal to 1% (i.e., P(ACK to Error)<=0.01), a probability that a Negative Acknowledgment (NACK) is received as an ACK must be lower than or equal to 0.1% (i.e., P(NACK to ACK)<=0.001), and a probability that silence (i.e., Discontinuous Transmission (DTX)) is interpreted as an ACK must be lower than or equal to 1% (i.e., P(DTX to ACK)<=0.01). A better performance, i.e. a lower required SNR, means that less transmission power is needed to convey the PUCCH. This is good not only for system efficiency, range, and reduced interference, but also for reduced power consumption in the UE. The cubic metric is defined as, c.f. [1], $$CM[s(t)]|_{dB} \triangleq \frac{20\log\left[\text{rms}\left[\left(\frac{|s(t)|}{\text{rms}[s(t)]}\right)^3\right]\right] - \text{ref\_dB}}{K}$$

where s(t) is the transmitted signal, ref_dB=1.52 decibels (dB) and K=1.56.

The cubic metric is a measure of how much the transmitted signal fluctuates and as such is an indication of how much the transmitter must back-off the transmission power to not exceed the maximum allowed power. Note that while the selected ref_dB will affect the absolute value of the cubic metric, it will not affect the comparison between two different cubic metrics. Hence, the selected ref_dB will not matter in the context of this document. The K value, as stated in [1], is optimized for Long Term Evolution (LTE) which is assumed to be similar enough to NR-U. Naturally, a low cubic metric is good since that would allow the transmitter to work near optimal transmission power all the time.

Figure 2:
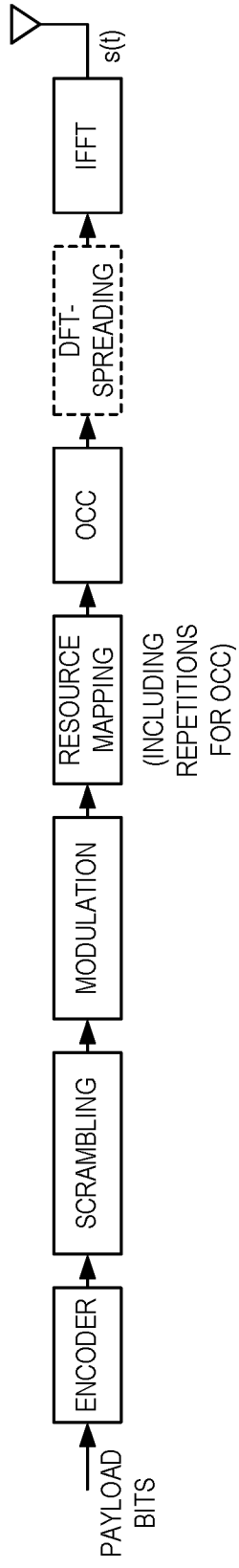
FIG. 2 is a block diagram illustrating components of a transmitter in accordance with some embodiments of the present disclosure.
Figure 3:
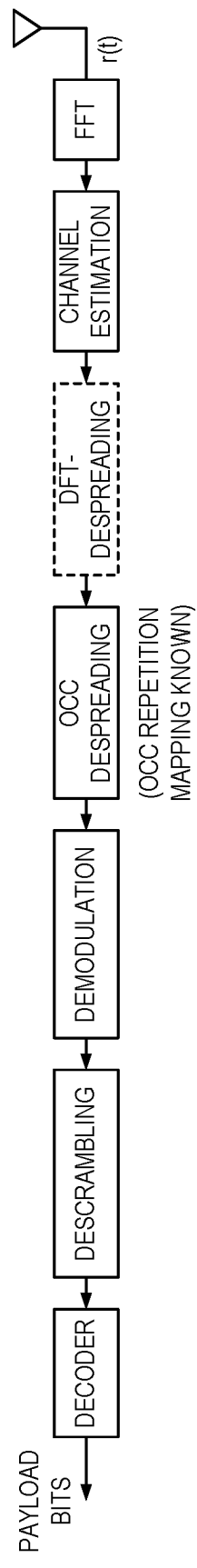
FIG. 3 is a block diagram illustrating components of a receiver in accordance with some embodiments of the present disclosure.

OFDM and DFT-s-OFDM are commonly used in both LTE and NR. The difference between the two is the DFT-spreading performed before the transmitter Inverse Fast Fourier Transform (IFFT), see FIG. 2. FIG. 2 is a block diagram illustrating the components of a transmitter that are relevant to the present disclosure, and the de-spreading in the receiver. DFT-spreading is done to reduce the cubic metric by transforming the signal into a signal having a single carrier property. Similarly, FIG. 3 is a block diagram illustrating the components of a receiver that are relevant to the present disclosure. The OCC repetition mapping is known for OCC de-spreading.

Simulations have shown that the performance and cubic metric are affected by how the I/Q data symbol repetition used for OCC is mapped over the subcarriers within a PRB. The two mappings considered here are symbol repetition and block repetition. In symbol repetition, each symbol is repeated the required number of times and mapped to consecutive subcarriers. In block repetition, the entire block of symbols within a PRB is repeated the required number of times, i.e. the repetitions of the same symbol will not be mapped consecutively in the PRB. See FIG. 4 for an illustration of the differences between symbol and block repetition within a PRB.

Figure 4:
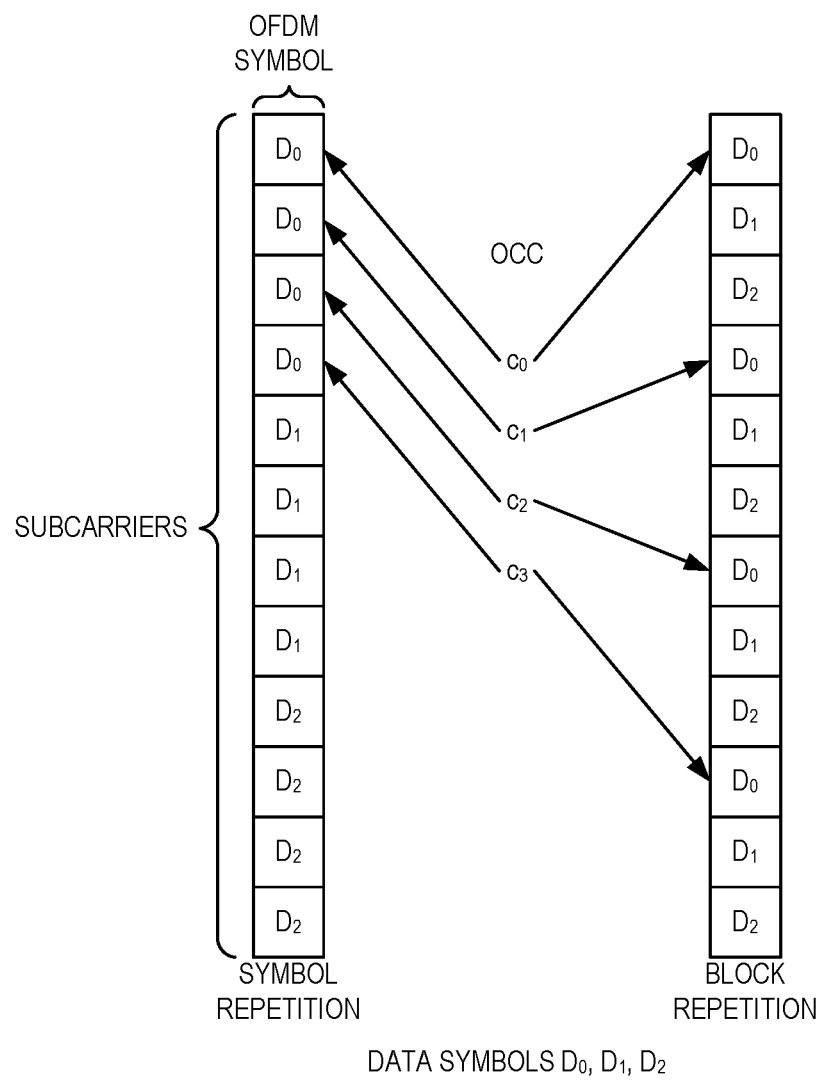
FIG. 4 illustrates symbol repetition within a Physical Resource Block (PRB) and block repetition within a PRB in accordance with some embodiments of the present disclosure.

In particular, FIG. 4 is an illustration of symbol repetition versus block repetition for OCC within a PRB for four user OCC, i.e., three data symbols per PRB. For simplicity, FIG. 4 only shows how the OCC code is applied to the first data symbol.

Figure 5A:
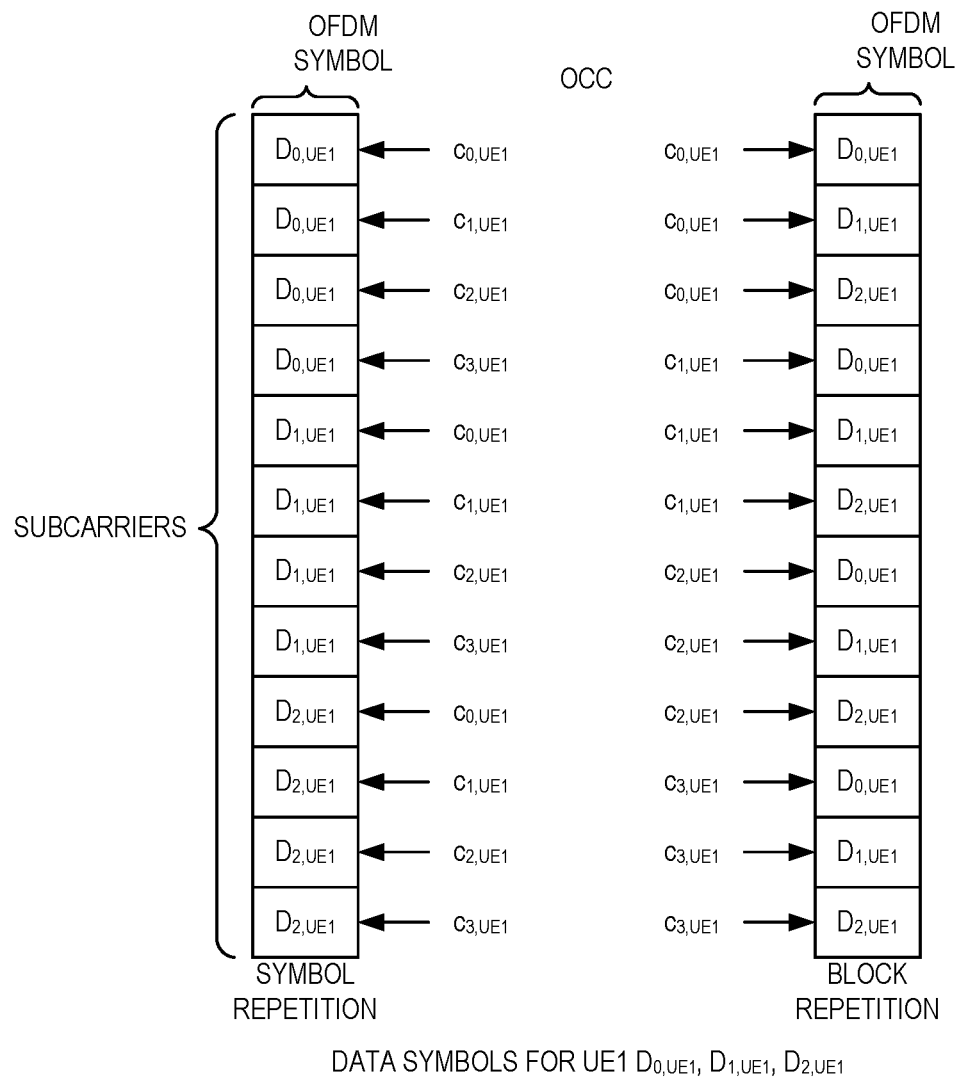
FIGS. 5A through 5D illustrate the use of the examples of symbol repetition and block repetition of FIG. 4 are used for four users, which are referred to as User Equipment 1 (UE1) through UE4.
Figure 5B:
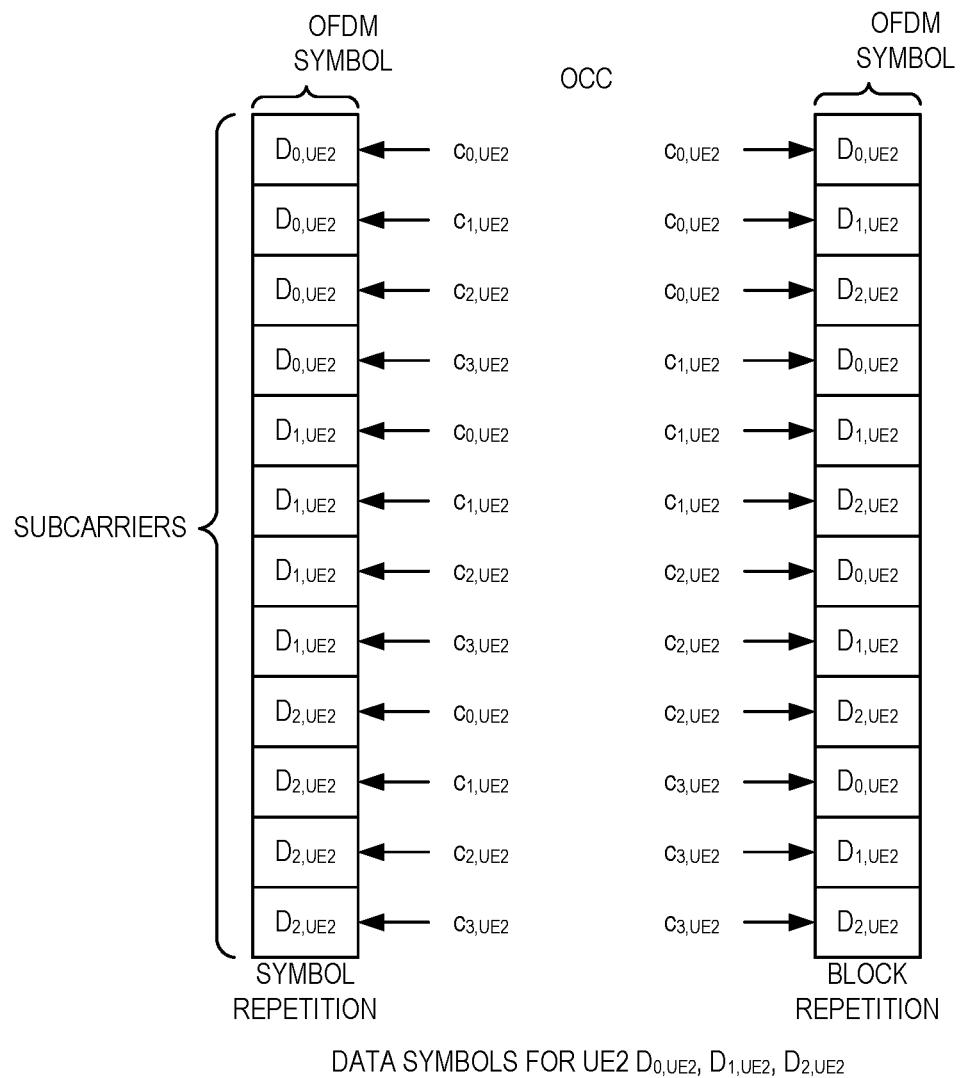
Figure 5C:
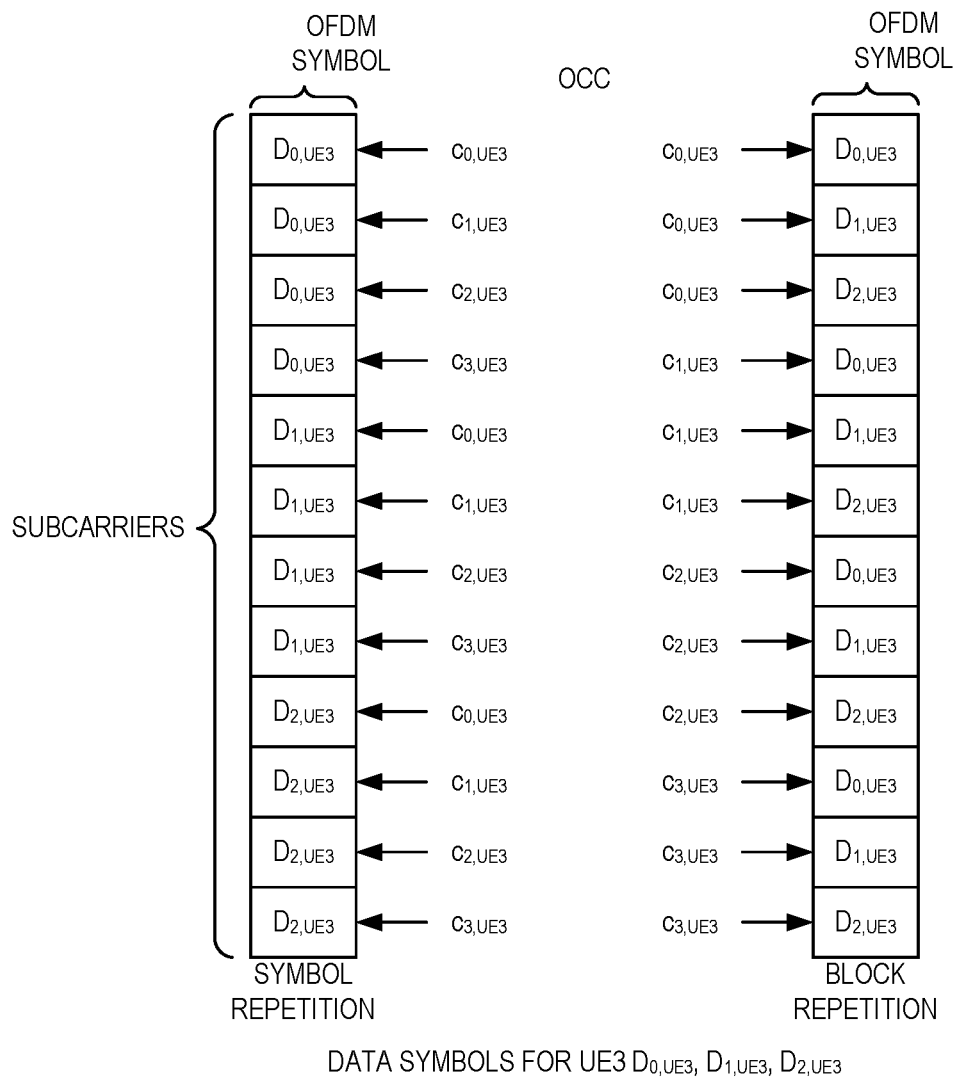
Figure 5D:
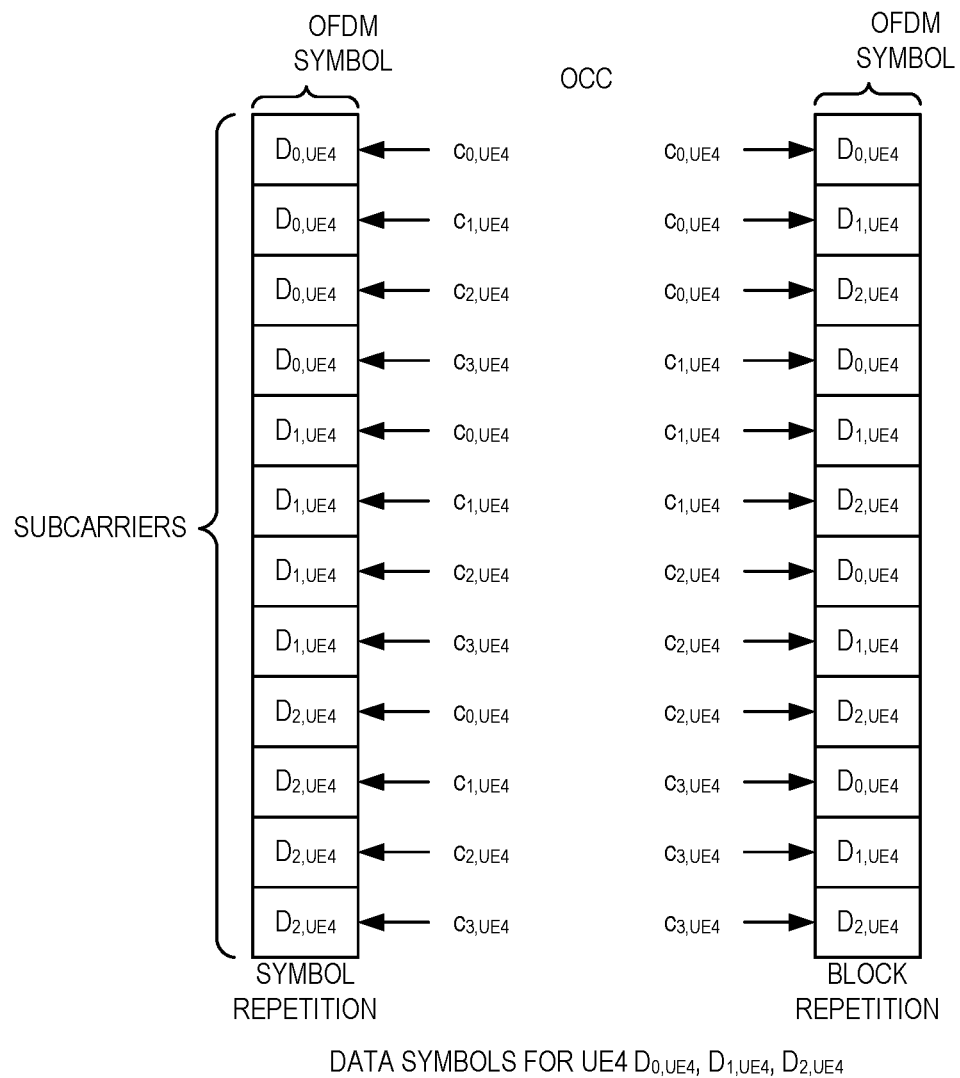

FIGS. 5A through 5D illustrate how the example of symbol repetition and block repetition of FIG. 4 is used for four users, which are referred to as UE1 through UE4. FIG. 5A illustrates symbol repetition versus block repetition for UE1. The I/Q data symbols transmitted in the PRB by UE1 for the illustrated OFDM symbol can be denoted as $D_{0,UE1}$, $D_{1,UE1}$, and $D_{2,UE1}$. Each of these I/Q data symbols is repeated four times in the frequency domain (i.e., repeated four times within the PRB for the same OFDM symbol). Note that the initial transmission of the I/Q data symbol is also referred to herein as a repetition. Each user (i.e., each UE) is assigned a different OCC. The OCC for UE1 is denoted as $[c_{0,UE1},c_{1,UE1},c_{2,UE1},c_{3,UE1}]$. In other words, the OCC is length 4, and there are four different OCCs, one for each user. For each user, the same OCC (i.e., the length 4 OCC of that user) is applied to the four repetitions of each I/Q data symbol. In the same manner, FIG. 5B illustrates symbol repetition versus block repetition for UE2, FIG. 5C illustrates symbol repetition versus block repetition for UE3, and FIG. 5D illustrates symbol repetition versus block repetition for UE4.

Figure 6:
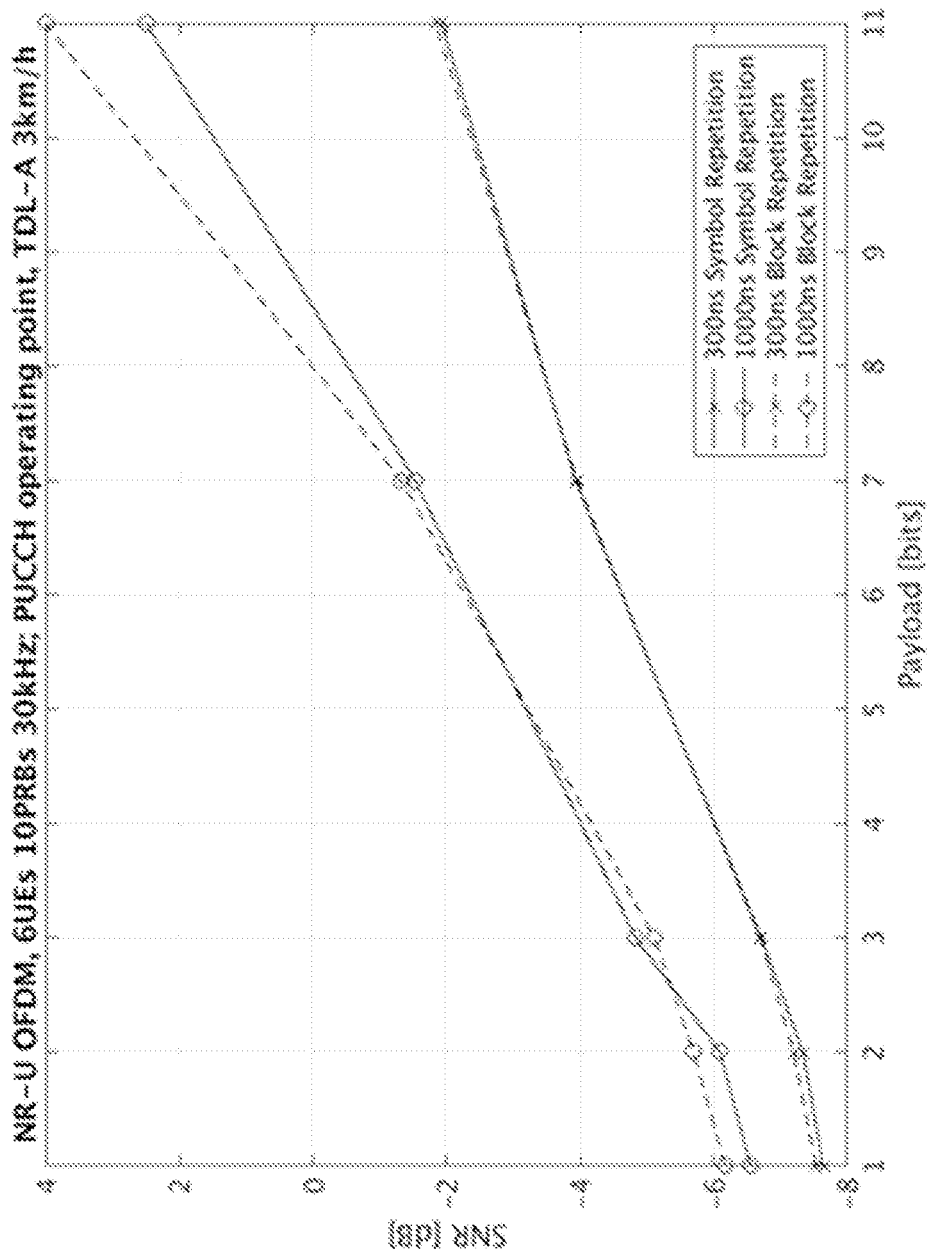
FIG. 6 illustrates example simulation results of the Physical Uplink Control Channel (PUCCH) operating point for an NR-Unlicensed (NR-U) candidate using Orthogonal Frequency Division Multiplexing (OFDM), two OFDM-symbols (one Demodulation Reference Symbol (DMRS) and one DATA symbol), ten PRBs interlaced, 30 kilohertz (kHz) subcarrier spacing, a Tapped Delay Line-A (TDL-A) 3 kilometers per hour (km/h) channel, and six UEs multiplexed.

Simulation results for OFDM for symbol and block repetition is shown in FIG. 6 Note that while the term "OFDM" is used herein, practical implementations of OFDM use a Cyclic Prefix (CP) and, as such, OFDM is sometimes referred to as CP-OFDM. In particular, FIG. 6 illustrates the operating point for an NR-U candidate using OFDM, two OFDM-symbols (one Demodulation Reference Signal (DMRS) one DATA), ten PRBs interlaced, 30 kilohertz (kHz) subcarrier spacing, Tapped Delay Line-A (TDL-A) 3 kilometers per hour (km/h) channel, and six UEs multiplexed. The legend specifies the delay spread of the channel. For OFDM, there is a preference to use symbol repetition with gains up to 0.4 dB for low payloads and up to 2 dB for higher payloads for high delay spreads. For lower delay spreads, the difference is barely noticeable. The reason for this is the benefit of using consecutive subcarriers for repeating the same data when the delay spread is high. Since high delay spread equals high frequency selectivity, subcarriers far apart will be affected differently by the channel which becomes problematic for the block repetition mapping when the receiver is to combine the repetitions to cancel the interference.

Figure 7:
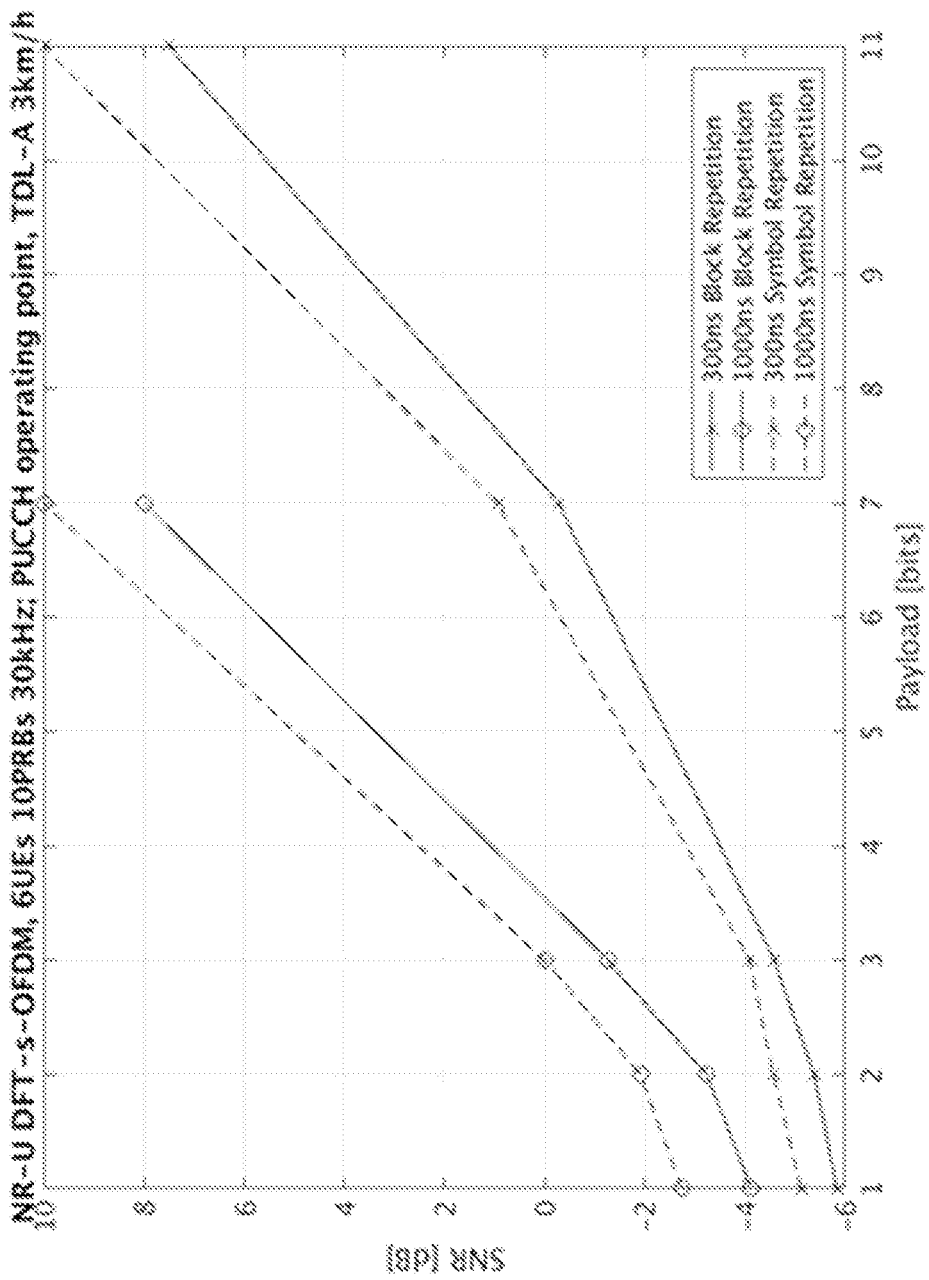
FIG. 7 illustrates example simulation results of the PUCCH operating point for NR-U candidate using Discrete Fourier Transform spread OFDM (DFT-s-OFDM), two OFDM-symbols (one DMRS and one DATA symbol), ten PRBs interlaced, 30 kHz subcarrier spacing, a TDL-A 3 km/h channel, and six UEs multiplexed.

Simulation results for DFT-s-OFDM for symbol and block repetition are shown in FIG. 7. FIG. 7 illustrates operating point for NR-U candidate using DFT-s-OFDM, two OFDM-symbols (one DMRS one DATA), ten PRBs interlaced, 30 kHz subcarrier spacing, TDL-A 3 km/h channel, and six UEs multiplexed. The legend specifies the delay spread of the channel. For DFT-s-OFDM, the consecutive mapping of symbol repetition does not matter since the signal is anyway transformed by the DFT-spreading, hence there is no gain of using symbol repetition for higher delay spreads. The Fourier transform reflects the frequency contents of its input, as a result the output from the DFT-spreading will reflect the frequency contents of the signal. The whiter the signal is the more it will harvest the frequency diversity gains of the assigned channel. On the other hand, the more non-white the signal is, the less it will use the possible frequency diversity gains of the assigned channel. Consequently, the more repetition there is in the signal, the less of the possible frequency diversity gains of the channel will be used and the performance will be worse. This is especially problematic for NR-U since the allocated channel spans such a large bandwidth. Because of this, it is beneficial to break up the repetition structure used in symbol repetition with block repetition. The performance gain of using block repetition for DFT-s-OFDM with NR-U is in this case roughly 1-2 dB.

For the OFDM case, the cubic metric for symbol repetition and block repetition is identical. However, for the DFT-s-OFDM case the block repetition mapping roughly has a 1 dB lower cubic metric than the symbol repetition mapping which increases the gain of using block repetition with 1 dB.

In a first embodiment, a wireless device (e.g., a UE) selects an appropriate I/Q symbol repetition mapping for repetitions used for intra data symbol OCC. The appropriate I/Q symbol repetition mapping for the repetitions is preferably one that improves performance. In some particular embodiments, the repetitions are I/Q symbol repetitions for a NR-U PUCCH transmission.

In a second embodiment, the method of the first embodiment is applied to OFDM with symbol repetition. An example of the symbol repetition is illustrated in FIG. 4.

In a third embodiment, the method of the first embodiment is applied to DFT-s-OFDM with block repetition. An example of the block repetition is illustrated in FIG. 4.

In a fourth embodiment, the method of any one of the first, second, or third embodiments is applied to any other similar setting which is not PUCCH and/or not NR-U.

In a fifth embodiment, the method of any one of the first through fourth embodiments is not limited to one PRB. In other words, the I/Q repetitions may span more than one PRB.

In a sixth embodiment, the method of any one of the first through fifth embodiments where OFDM uses block repetition and/or DFT-s-OFDM uses symbol repetition.

In a seventh embodiment, the method of any one of the first through sixth embodiments where the method is used on DMRS symbols or any other type of symbol, instead of DATA symbols.

In an eighth embodiment, the method of any one of the first through seventh embodiments where the repetition mapping is not described in FIG. 4 (i.e., the repetition mapping is one other than those illustrated in FIG. 4).

In a ninth embodiment, the method of any one of the first through eighth embodiments where the repetition mapping is selected based on the coderate and/or payload size. For example, if it is desirable for the operating point to be as low as possible (i.e., in SNR), in some embodiments, for a particular coderate and/or payload, the repetition mapping that provides the lowest operating point for that coderate and/or payload is selected. Note though that both the UE and the base station need to select the same repetition mapping.

In a tenth embodiment, the method of any one of the first through ninth embodiments where the intra data symbol OCC is cycled over the frequency domain, i.e. different OCCs for different subsets of the entire frequency range. For example, a subset could be a PRB. Different users would then use different shifts, or different starting OCCs, of this expanded OCC.

Figure 8:
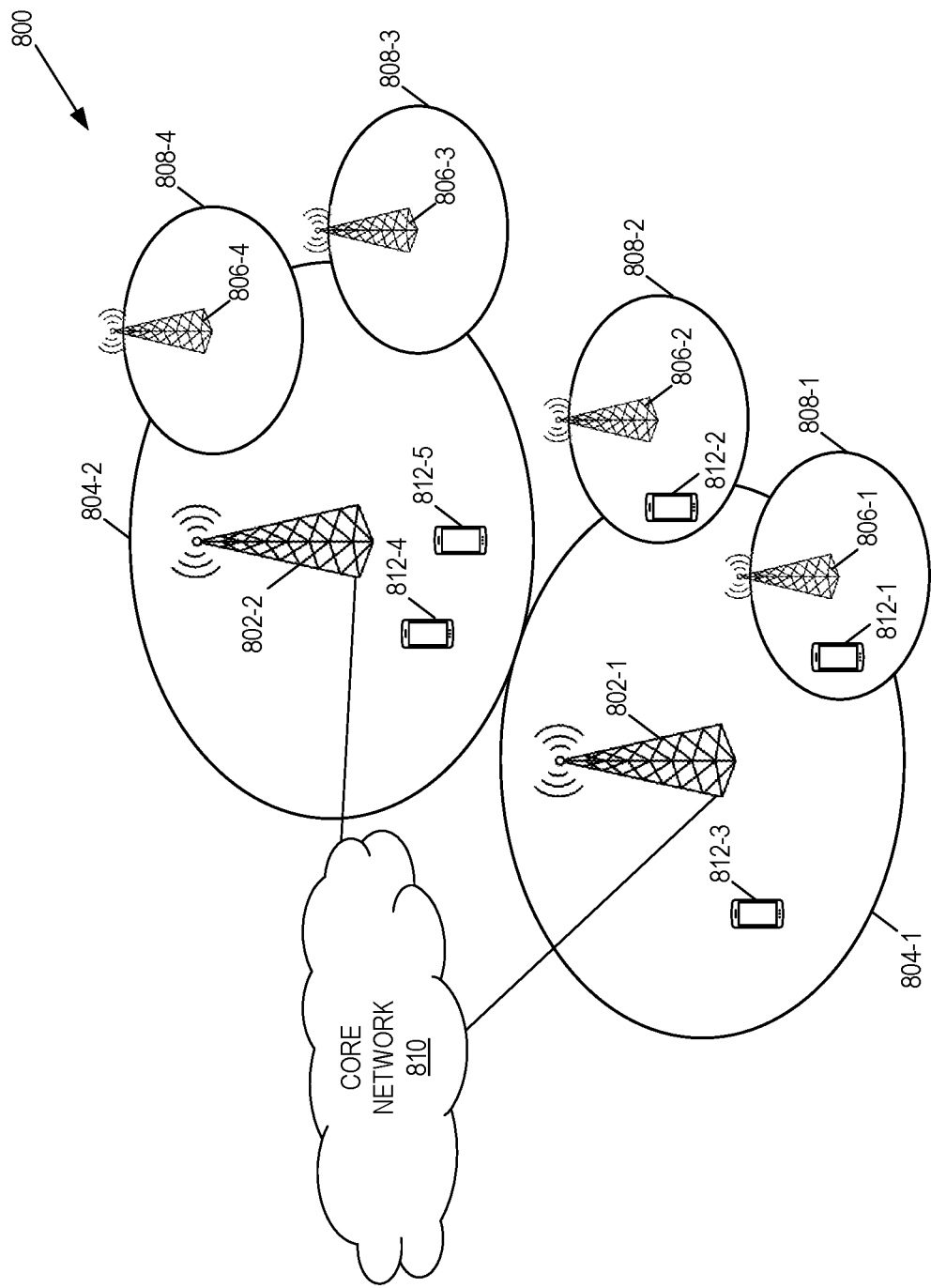
FIG. 8 illustrates one example of a cellular communications network in which embodiments of the present disclosure may be implemented.

FIG. 8 illustrates one example of a cellular communications network 800 according to some embodiments of the present disclosure. In the embodiments described herein, the cellular communications network 800 is a 5G NR network in which at least some of the cells are NR-U cells or the cellular communications network 800 is a NR-U network. In this example, the cellular communications network 800 includes base stations 802-1 and 802-2, which in 5G NR and NR-U are referred to as NR base stations (gNBs), controlling corresponding macro cells 804-1 and 804-2. The base stations 802-1 and 802-2 are generally referred to herein collectively as base stations 802 and individually as base station 802. Likewise, the macro cells 804-1 and 804-2 are generally referred to herein collectively as macro cells 804 and individually as macro cell 804. The cellular communications network 800 may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The base stations 802 (and optionally the low power nodes 806) are connected to a core network 810.

The base stations 802 and the low power nodes 806 provide service to wireless devices 812-1 through 812-5 in the corresponding cells 804 and 808. The wireless devices 812-1 through 812-5 are generally referred to herein collectively as wireless devices 812 and individually as wireless device 812. The wireless devices 812 are also sometimes referred to herein as UEs.

At least some of the cells are NR-U cells. Note that while many of the embodiments described herein are for NR-U, the present disclosure is not limited to NR-U.

Figure 9:
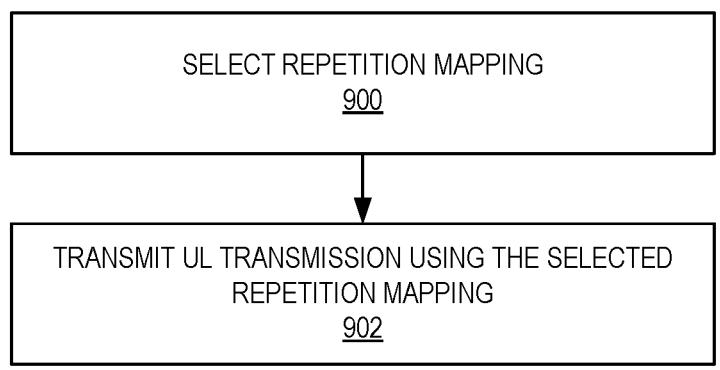
FIG. 9 is a flow chart that illustrates the operation of a wireless device in accordance with at least some embodiments of the present disclosure.

FIG. 9 is a flow chart that illustrates the operation of a wireless device 812 in accordance with at least some of the embodiments described herein. As illustrated, the wireless device 812 selects a repetition mapping for I/Q symbol repetitions within an OFDM or DFT-s-OFDM symbol of an uplink transmission, where the I/Q symbol repetitions are for application of an intra data symbol OCC to the I/Q symbol repetitions (step 900). In some embodiments, the selection is based on one or more criteria such as, e.g., coderate and/or payload size for the uplink transmission. For example, different repetition mappings may be predefined (e.g., by an applicable standard) for, e.g., coderates and/or payload sizes, and the wireless device 812 then selects which repetition mapping to use based on this predefined information. In some other embodiments, the wireless device 812 selects the repetition mapping based on an explicit configuration or instruction from the network (e.g., from a base station 802). For example, the network may send an instruction or configuration to the wireless device 812 to use a particular repetition mapping, and the wireless device 812 then selects that particular repetition mapping in accordance with the instruction or configuration.

In some embodiments, the OFDM or DFT-s-OFDM symbol is an OFDM symbol, and selecting the repetition mapping for the I/Q symbol repetitions comprises selecting a symbol repetition mapping as the repetition mapping for the I/Q symbol repetitions within the OFDM symbol of the uplink transmission. In some embodiments, the OFDM or DFT-s-OFDM symbol is an OFDM symbol, and selecting the repetition mapping for the I/Q symbol repetitions comprises selecting a block repetition mapping as the repetition mapping for the I/Q symbol repetitions within the OFDM symbol of the uplink transmission. In some embodiments, the OFDM or DFT-s-OFDM symbol is a DFT-s-OFDM symbol, and selecting the repetition mapping for the I/Q symbol repetitions comprises selecting a block repetition mapping as the repetition mapping for the I/Q symbol repetitions within the OFDM symbol of the uplink transmission. In some embodiments, the OFDM or DFT-s-OFDM symbol is a DFT-s-OFDM symbol, and selecting the repetition mapping for the I/Q symbol repetitions comprises selecting a symbol repetition mapping as the repetition mapping for the I/Q symbol repetitions within the OFDM symbol of the uplink transmission.

The wireless device 812 transmits an uplink transmission using the selected repetition mapping (step 902). In some embodiments, the uplink transmission is a physical uplink channel transmission in an unlicensed spectrum. In some embodiments, the uplink transmission is an NR-U physical uplink channel transmission. In some embodiments, the uplink transmission is a PUCCH transmission. In some embodiments, the I/Q symbol repetitions are within a single PRB. In some embodiments, the I/Q symbol repetitions are within two or more PRBs. In some embodiments, the I/Q symbol repetitions are repetitions of one or more I/Q data symbols. In some embodiments, the I/Q symbol repetitions are repetitions of one or more I/Q symbols other than data symbols (e.g., DMRS symbols).

Note that while the discussion above focuses on that of the wireless device 812, the radio access node 802 (e.g., a gNB) may, in some embodiments, provide information that either instructs or configures the wireless device 812 to select a particular repetition mapping or assists the wireless device 812 in the selection of the particular repetition mapping to be used by the wireless device 812. As an example, in some embodiments, the radio access node 802 provides an instruction or configuration to the wireless device 812 to use a particular repetition mapping. In some other embodiments, the wireless device 812 and the radio access node 802 each select the repetition mapping, where the selection is performed in such a manner that the same repetition mapping is selected at both the wireless device 812 and the radio access node 802. For example, both the wireless device 812 and the radio access node 802 may independently select (or derive) the repetition mapping to be used based on, e.g., the same information.

Figure 10:
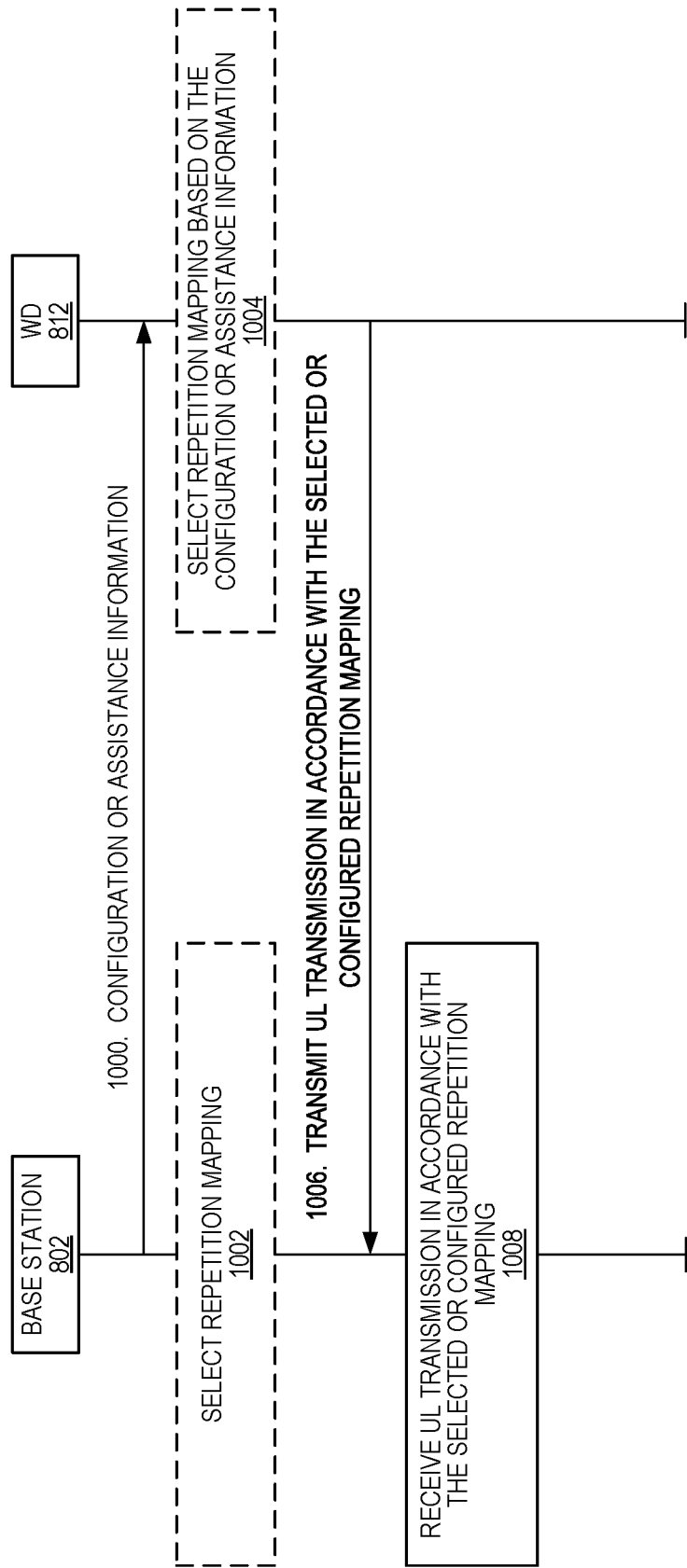
FIG. 10 illustrates one example of the operation of a radio access node and a wireless device in which the base station provides configuration or assistance information to the wireless device.

FIG. 10 illustrates one example of the operation of the radio access node 802 (shown as a base station 802) and a wireless device 812 in which the base station 802 provides configuration or assistance information to the wireless device 812 as described above. In this example, the base station 802 provides configuration or assistance information to the wireless device 812 (step 1000). In some embodiments, this information is an instruction or configuration for the wireless device 812 to use a particular repetition mapping. In some other embodiments, the information is information that assists the wireless device 812 in selecting a particular repetition mapping. Optionally, the base station 802 and the wireless device 812 select a particular repetition mapping (e.g., based on the instruction or configuration provided in step 1000 or based on the assistance information provided in step 1000) (steps 1002-1004). The wireless device 812 transmits an uplink transmission (e.g., a NR-U PUCCH transmission) in accordance with the selected or configured repetition mapping (step 1006). The base station 802 receives the uplink transmission in accordance with the selected or configured repetition mapping (step 1008).

Figure 11:
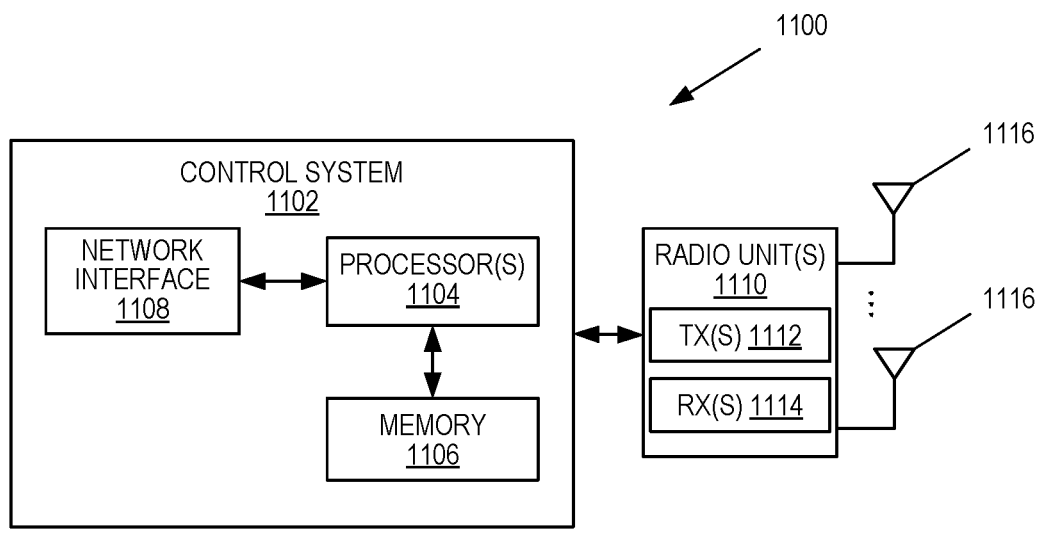
FIGS. 11 through 13 illustrate example embodiments of a radio access node (e.g., a base station)

FIG. 11 is a schematic block diagram of a radio access node 1100 according to some embodiments of the present disclosure. The radio access node 1100 may be, for example, a base station 802 or 806. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
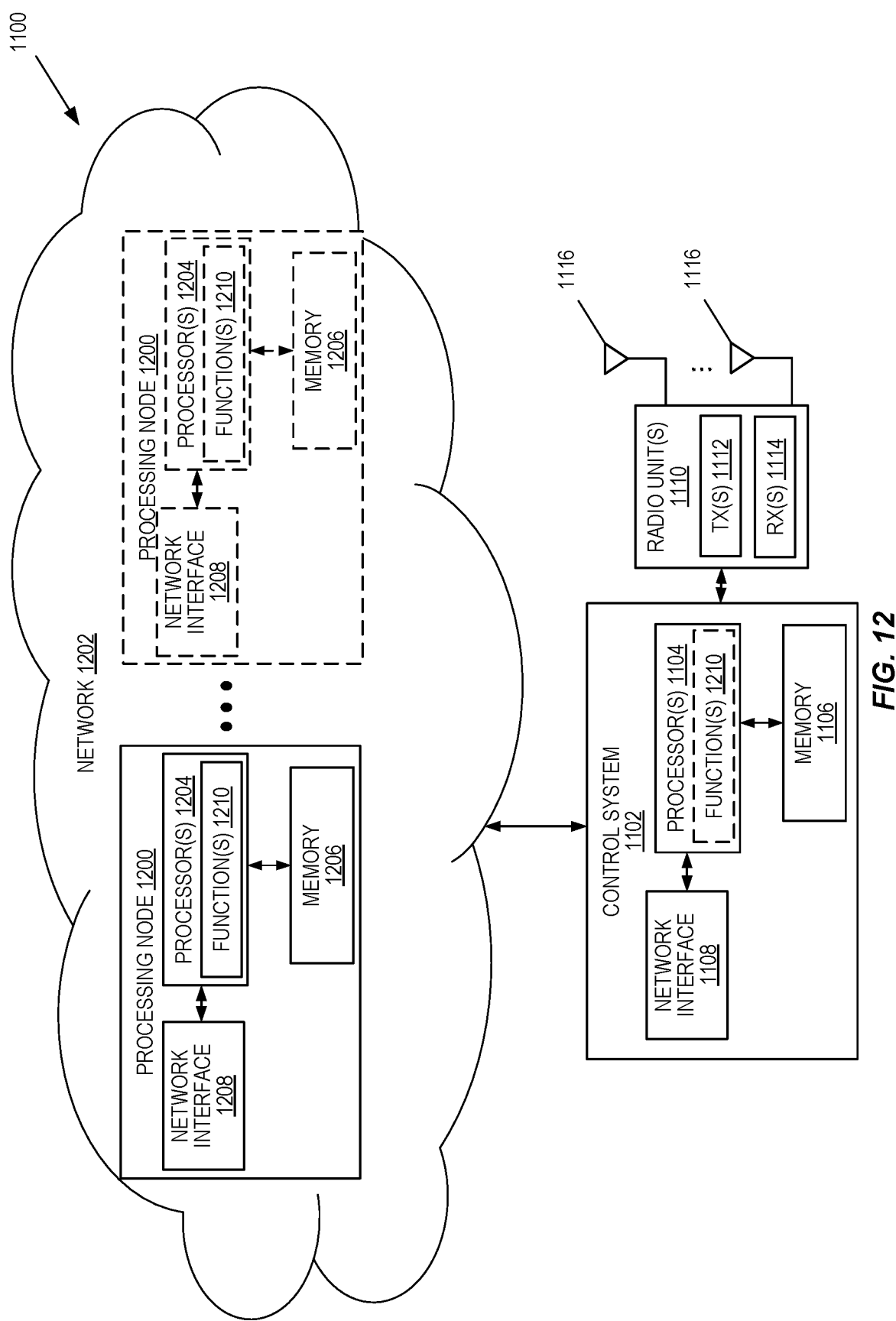

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
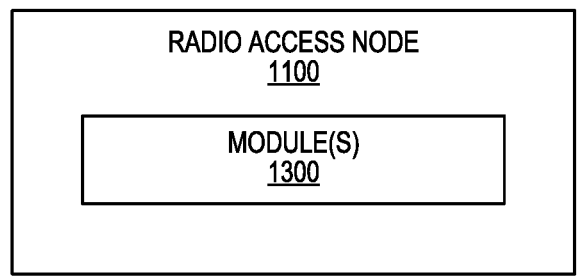

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
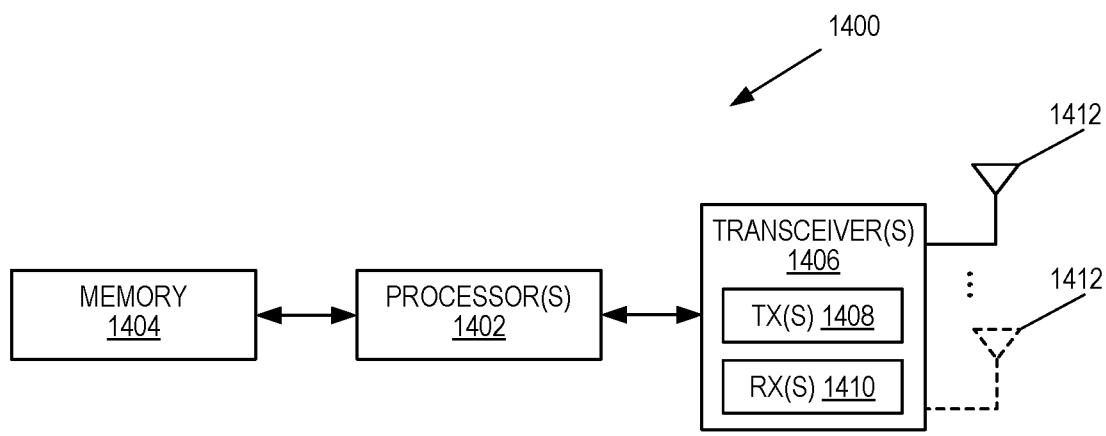
FIGS. 14 and 15 illustrate example embodiments of a UE.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
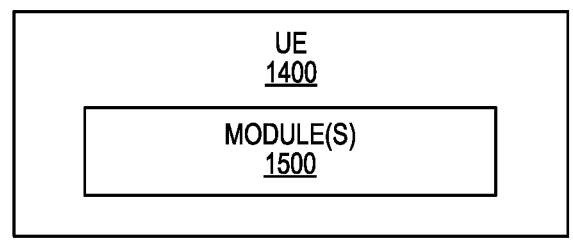

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
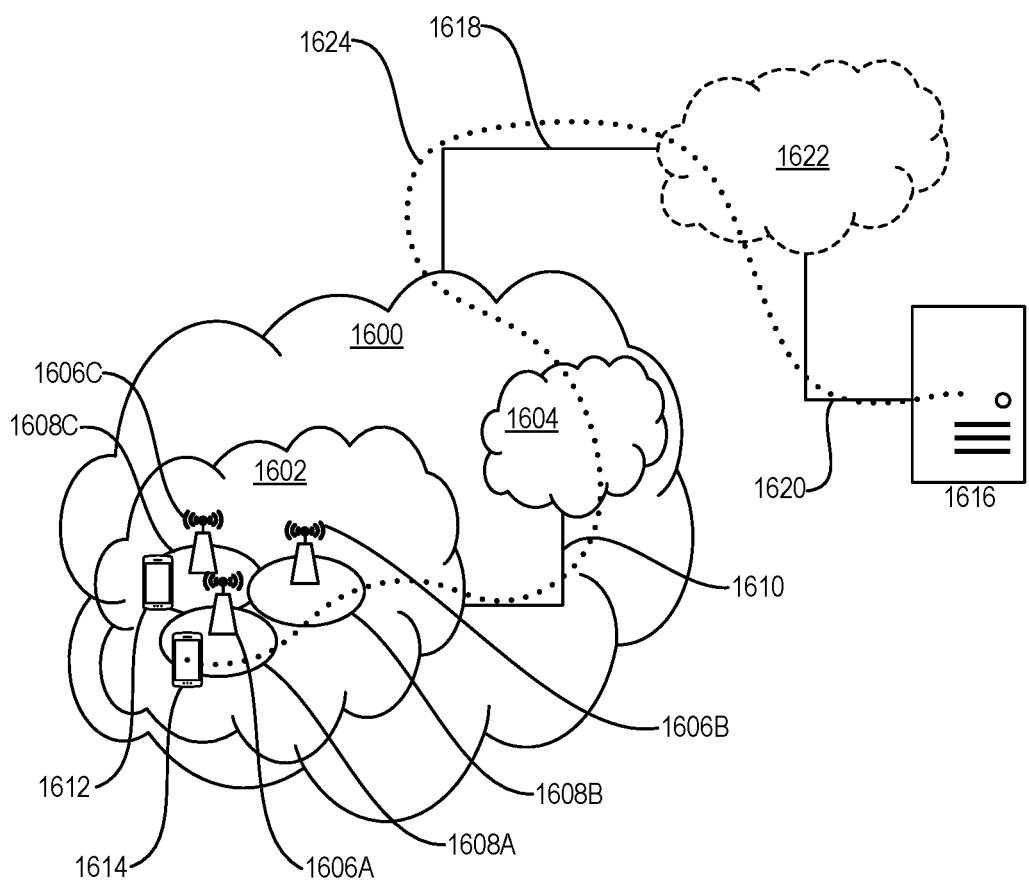
FIG. 16 illustrates a communication system including a telecommunication network, which comprises an access network and a core network, in which embodiments of the present disclosure may be implemented.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
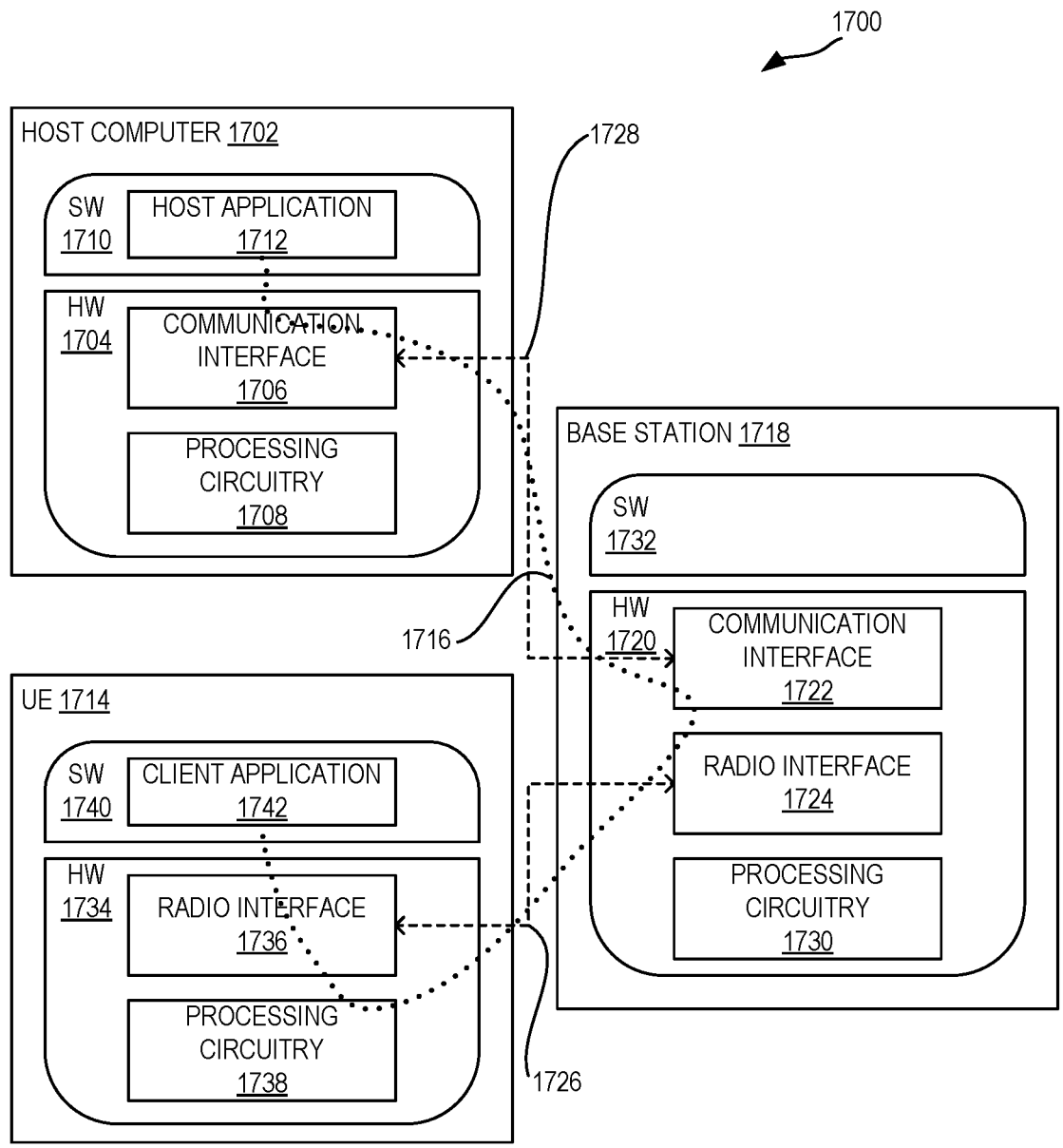
FIG. 17 illustrates example implementations, in accordance with an embodiment, of the UE, base station, and host computer of the system of FIG. 16.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device, the method comprising:
  selecting a repetition mapping for I/Q symbol repetitions within an OFDM or DFT-s-OFDM symbol of an uplink transmission, the I/Q symbol repetitions being for application of an intra data symbol OCC to the I/Q symbol repetitions; and
  transmitting an uplink transmission using the selected repetition mapping.

Embodiment 2: The method of embodiment 1 wherein the uplink transmission is a physical uplink channel transmission in an unlicensed spectrum.

Embodiment 3: The method of embodiment 1 wherein the uplink transmission is an NR-U physical uplink channel transmission.

Embodiment 4: The method of any one of embodiments 1 to 3 wherein the OFDM or DFT-s-OFDM symbol is an OFDM symbol, and selecting the repetition mapping for the I/Q symbol repetitions comprises selecting a symbol repetition mapping as the repetition mapping for the I/Q symbol repetitions within the OFDM symbol of the uplink transmission.

Embodiment 5: The method of any one of embodiments 1 to 3 wherein the OFDM or DFT-s-OFDM symbol is an OFDM symbol, and selecting the repetition mapping for the I/Q symbol repetitions comprises selecting a block repetition mapping as the repetition mapping for the I/Q symbol repetitions within the OFDM symbol of the uplink transmission.

Embodiment 6: The method of any one of embodiments 1 to 3 wherein the OFDM or DFT-s-OFDM symbol is a DFT-s-OFDM symbol, and selecting the repetition mapping for the I/Q symbol repetitions comprises selecting a block repetition mapping as the repetition mapping for the I/Q symbol repetitions within the OFDM symbol of the uplink transmission.

Embodiment 7: The method of any one of embodiments 1 to 3 wherein the OFDM or DFT-s-OFDM symbol is a DFT-s-OFDM symbol, and selecting the repetition mapping for the I/Q symbol repetitions comprises selecting a symbol repetition mapping as the repetition mapping for the I/Q symbol repetitions within the OFDM symbol of the uplink transmission.

Embodiment 8: The method of any one of embodiments 1 to 7 wherein the uplink transmission is a physical uplink control channel transmission.

Embodiment 9: The method of any one of embodiments 1 to 8 wherein the I/Q symbol repetitions are within a single PRB.

Embodiment 10: The method of any one of embodiments 1 to 8 wherein the I/Q symbol repetitions are within two or more PRBs.

Embodiment 11: The method of any one of embodiments 1 to 10 wherein the I/Q symbol repetitions are repetitions of one or more I/Q data symbols.

Embodiment 12: The method of any one of embodiments 1 to 10 wherein the I/Q symbol repetitions are repetitions of one or more I/Q symbols other than data symbols (e.g., DMRS symbols).

Embodiment 13: The method of any one of embodiments 1 to 12 wherein selecting the repetition mapping for I/Q symbol repetitions comprises selecting the repetition mapping for the I/Q symbol repetitions based on coderate and/or payload size.

Embodiment 14: The method of any one of embodiments 1 to 13 wherein the intra data symbol OCC is cycled over the frequency domain.

Embodiment 15: The method of any one of embodiments 1 to 13 wherein the intra data symbol OCC is cycled over the frequency domain such that different OCCs are used for different subsets of a frequency range.

Embodiment 16: The method of embodiment 15 wherein the different OCCs used for different subsets of a frequency range for a first UE are orthogonal to the OCCs for a second UE in each subset of the frequency range.

Embodiment 17: The method of any of the previous embodiments, further comprising: providing user data; and forwarding the user data to a host computer via the transmission to the base station.

Group B Embodiments

Embodiment 18: A method performed by a base station, the method comprising providing, to a wireless device, information that assists the wireless device with selection of a repetition mapping for I/Q symbol repetitions within an OFDM or DFT-s-OFDM symbol of an uplink transmission, the I/Q symbol repetitions being for application of an intra data symbol OCC to the I/Q symbol repetitions.

Embodiment 19: The method of embodiment 18 wherein the information comprises an instruction or configuration that instructs the wireless device to use a particular one of two or more predefined repetition mappings.

Embodiment 20: The method of any of the previous embodiments, further comprising: obtaining user data; and forwarding the user data to a host computer or a wireless device.

Group C Embodiments

Embodiment 21: A wireless device, the wireless device comprising processing circuitry configured to perform any of the steps of any of the Group A embodiments and power supply circuitry configured to supply power to the wireless device.

Embodiment 22: A base station, the base station comprising processing circuitry configured to perform any of the steps of any of the Group B embodiments and power supply circuitry configured to supply power to the base station.

Embodiment 23: A User Equipment, UE, comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 24: A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

Embodiment 25: The communication system of the previous embodiment further including the base station.

Embodiment 26: The communication system of the previous 2 embodiments, further including the UE, wherein the UE is configured to communicate with the base station.

Embodiment 27: The communication system of the previous 3 embodiments, wherein the processing circuitry of the host computer is configured to execute a host application, thereby providing the user data, and the UE comprises processing circuitry configured to execute a client application associated with the host application.

Embodiment 28: A method implemented in a communication system including a host computer, a base station, and a User Equipment, UE, the method comprising:
at the host computer, providing user data; and
at the host computer, initiating a transmission carrying the user data to the UE via a cellular network comprising the base station, wherein the base station performs any of the steps of any of the Group B embodiments.

Embodiment 29: The method of the previous embodiment, further comprising, at the base station, transmitting the user data.

Embodiment 30: The method of the previous 2 embodiments, wherein the user data is provided at the host computer by executing a host application, the method further comprising, at the UE, executing a client application associated with the host application.

Embodiment 31: A User Equipment, UE, configured to communicate with a base station, the UE comprising a radio interface and processing circuitry configured to perform the method of the previous 3 embodiments.

Embodiment 32: A communication system including a host computer comprising:
   processing circuitry configured to provide user data; and
   a communication interface configured to forward user data to a cellular network for transmission to a User Equipment, UE;
   wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: The communication system of the previous 2 embodiments, wherein the processing circuitry of the host computer is configured to execute a host application, thereby providing the user data, and the UE's processing circuitry is configured to execute a client application associated with the host application.

Embodiment 35: A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the UE performs any of the steps of any of the Group A embodiments.

Embodiment 36: The method of the previous embodiment, further comprising at the UE, receiving the user data from the base station.

Embodiment 37: A communication system including a host computer comprising:
   communication interface configured to receive user data originating from a transmission from a User Equipment, UE, to a base station;
   wherein the UE comprises a radio interface and processing circuitry, the UE's processing circuitry configured to perform any of the steps of any of the Group A embodiments.

Embodiment 38: The communication system of the previous embodiment, further including the UE.

Embodiment 39: The communication system of the previous 2 embodiments, further including the base station, wherein the base station comprises a radio interface configured to communicate with the UE and a communication interface configured to forward to the host computer the user data carried by a transmission from the UE to the base station.

Embodiment 40: The communication system of the previous 3 embodiments, wherein the processing circuitry of the host computer is configured to execute a host application, and the UE's processing circuitry is configured to execute a client application associated with the host application, thereby providing the user data.

Embodiment 41: The communication system of the previous 4 embodiments, wherein the processing circuitry of the host computer is configured to execute a host application, thereby providing request data, and the UE's processing circuitry is configured to execute a client application associated with the host application, thereby providing the user data in response to the request data.

Embodiment 42: A method implemented in a communication system including a host computer, a base station, and a User Equipment, UE, the method comprising, at the host computer, receiving user data transmitted to the base station from the UE, wherein the UE performs any of the steps of any of the Group A embodiments.

Embodiment 43: The method of the previous embodiment, further comprising, at the UE, providing the user data to the base station.

Embodiment 44: The method of the previous 2 embodiments, further comprising:
   at the UE, executing a client application, thereby providing the user data to be transmitted; and
   at the host computer, executing a host application associated with the client application.

Embodiment 45: The method of the previous 3 embodiments, further comprising:
   at the UE, executing a client application; and
   at the UE, receiving input data to the client application, the input data being provided at the host computer by executing a host application associated with the client application;
   wherein the user data to be transmitted is provided by the client application in response to the input data.

Embodiment 46: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 47: The communication system of the previous embodiment further including the base station.

Embodiment 48: The communication system of the previous 2 embodiments, further including the UE, wherein the UE is configured to communicate with the base station.

Embodiment 49: The communication system of the previous 3 embodiments, wherein:
   the processing circuitry of the host computer is configured to execute a host application; and
   the UE is configured to execute a client application associated with the host application, thereby providing the user data to be received by the host computer.

Embodiment 50: A method implemented in a communication system including a host computer, a base station, and a User Equipment, UE, the method comprising, at the host computer, receiving, from the base station, user data originating from a transmission which the base station has received from the UE, wherein the UE performs any of the steps of any of the Group A embodiments.

Embodiment 51: The method of the previous embodiment, further comprising at the base station, receiving the user data from the UE.

Embodiment 52: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
   3GPP Third Generation Partnership Project
   5G Fifth Generation
   ACK Acknowledgement
   AP Access Point
   ASIC Application Specific Integrated Circuit
   BWP Bandwidth Part
   CP Cyclic Prefix
   CPU Central Processing Unit
   dB Decibel DCI Downlink Control Information
DFT Discrete Fourier Transform
DFT-s-OFDM Discrete Fourier Transform spread Orthogonal Frequency Division Multiplexing
DMRS Demodulation Reference Signal
DTX Discontinuous Transmission
eMBB Enhanced Mobile Broadband
eNB Enhanced or Evolved Node B
FPGA Field Programmable Gate Array
gNB New Radio Base Station
HARQ Hybrid Automatic Repeat Request
IFFT Inverse Fast Fourier Transform
I/Q In-Phase/Quadrature-Phase
kHz Kilohertz
km/h Kilometers per Hour
LTE Long Term Evolution
MME Mobility Management Entity
MTC Machine Type Communication
NACK Negative Acknowledgement
NR New Radio
NR-U New Radio Unlicensed
OCC Orthogonal Cover Code
OFDM Orthogonal Frequency Division Multiplexing
OTT Over-the-Top
PBCH Physical Broadcast Channel
PDCCH Physical Downlink Control Channel
PDSCH Physical Downlink Shared Channel
P-GW Packet Data Network Gateway
PRACH Physical Random Access Channel
PRB Physical Resource Block
PSD Power Spectral Density
PSS Primary Synchronization Signal
PUCCH Physical Uplink Control Channel
PUSCH Physical Uplink Shared Channel
RAR Random Access Response
RB Resource Block
Rel Release
RMSI Remaining Minimum System Information
RRC Radio Resource Control
RRH Remote Radio Head
SCEF Service Capability Exposure Function
SCS Smaller Subcarrier Spacing
SNR Signal to Noise Ratio
SS Synchronization Signal
SSB Synchronization Signal Block
SSS Secondary Synchronization Signal
TDL-A Tapped Delay Line-A
UE User Equipment
URLLC Ultra-Reliable and Low Latency Communication Those skilled in the art will recognize improvements and modifications to the embodiments of the present disclosure. All such improvements and modifications are considered within the scope of the concepts disclosed herein.

REFERENCES

R1-060385, Motorola, 3GPP TSG RAN WG1 #44, Feb. 13-17, 2006

What is claimed is:

1. A method performed by a wireless device, the method comprising:
selecting a repetition mapping for In-Phase/Quadrature-Phase, I/Q, symbol repetitions within an Orthogonal Frequency Division Multiplexing, OFDM, or Discrete Fourier Transform spread OFDM, DFT-s-OFDM, symbol of an uplink transmission, the I/Q symbol repetitions being for application of an intra data symbol Orthogonal Cover Code, OCC, to the I/Q symbol repetitions; and
transmitting an uplink transmission using the selected repetition mapping.

2. The method of claim 1 wherein the uplink transmission is a physical uplink channel transmission in an unlicensed spectrum.

3. The method of claim 1 wherein the uplink transmission is a New Radio Unlicensed, NR-U, physical uplink channel transmission.

4. The method of claim 1 wherein the OFDM or DFT-s-OFDM symbol is an OFDM symbol, and selecting the repetition mapping for the I/Q symbol repetitions comprises selecting a symbol repetition mapping as the repetition mapping for the I/Q symbol repetitions within the OFDM symbol of the uplink transmission.

5. The method of claim 1 wherein the OFDM or DFT-s-OFDM symbol is an OFDM symbol, and selecting the repetition mapping for the I/Q symbol repetitions comprises selecting a block repetition mapping as the repetition mapping for the I/Q symbol repetitions within the OFDM symbol of the uplink transmission.

6. The method of claim 1 wherein the OFDM or DFT-s-OFDM symbol is a DFT-s-OFDM symbol, and selecting the repetition mapping for the I/Q symbol repetitions comprises selecting a block repetition mapping as the repetition mapping for the I/Q symbol repetitions within the OFDM symbol of the uplink transmission.

7. The method of claim 1 wherein the OFDM or DFT-s-OFDM symbol is a DFT-s-OFDM symbol, and selecting the repetition mapping for the I/Q symbol repetitions comprises selecting a symbol repetition mapping as the repetition mapping for the I/Q symbol repetitions within the OFDM symbol of the uplink transmission.

8. The method of claim 1 wherein the uplink transmission is a Physical Uplink Control Channel, PUCCH, transmission.

9. The method of claim 1 wherein the I/Q symbol repetitions are within a single Physical Resource Block, PRB.

10. The method of claim 1 wherein the I/Q symbol repetitions are within two or more Physical Resource Blocks, PRBs.

11. The method of claim 1 wherein the I/Q symbol repetitions are repetitions of one or more I/Q data symbols.

12. The method of claim 1 wherein the I/Q symbol repetitions are repetitions of one or more I/Q symbols other than data symbols.

13. The method of claim 1 wherein selecting the repetition mapping for the I/Q symbol repetitions comprises selecting the repetition mapping for the I/Q symbol repetitions based on either or both of: a coderate or a payload size.

14. The method of claim 1 wherein the intra data symbol OCC is cycled over the frequency domain.

15. The method of claim 1 wherein the intra data symbol OCC is cycled over the frequency domain such that different OCCs are used for different subsets of a frequency range.

16. The method of claim 15 wherein the different OCCs used for different subsets of a frequency range for a first User Equipment, UE, are orthogonal to the different OCCs for a second UE in each subset of the frequency range.

17. A wireless device for a cellular communications network, the wireless device adapted to:
select a repetition mapping for In-Phase/Quadrature-Phase, I/Q, symbol repetitions within an Orthogonal Frequency Division Multiplexing, OFDM, or Discrete Fourier Transform spread OFDM, DFT-s-OFDM, symbol of an uplink transmission, the I/Q symbol repetitions being for application of an intra data symbol Orthogonal Cover Code, OCC, to the I/Q symbol repetitions; and transmit an uplink transmission using the selected repetition mapping.

18. The wireless device of claim 17 wherein the wireless device comprises:

one or more transmitters; and processing circuitry associated with the one or more transmitters, the processing circuitry configured to cause the wireless device to:

select the repetition mapping for I/Q symbol repetitions within the OFDM or DFT-s-OFDM symbol of the uplink transmission, the I/Q symbol repetitions being for application of an intra data symbol OCC to the I/Q symbol repetitions; and transmit an uplink transmission using the selected repetition mapping.

19. A method performed by a base station, the method comprising:

providing, to a wireless device, information that either:

instructs the wireless device to use a particular repetition mapping for In-Phase/Quadrature-Phase, I/Q, symbol repetitions within an Orthogonal Frequency Division Multiplexing, OFDM, or Discrete Fourier Transform spread OFDM, DFT-s-OFDM, symbol of an uplink transmission, the I/Q symbol repetitions being for application of an intra data symbol Orthogonal Cover Code, OCC, to the I/Q symbol repetitions; or assists the wireless device with selection of a particular repetition mapping for I/Q symbol repetitions within an OFDM or DFT-s-OFDM symbol of an uplink transmission, the I/Q symbol repetitions being for application of an intra data symbol OCC to the I/Q symbol repetitions.

20. The method of claim 19 wherein the information comprises an instruction or configuration that instructs the wireless device to use a particular one of two or more predefined repetition mappings.

21. A base station for a cellular communications network, the base station adapted to:

provide, to a wireless device, information that either:

instructs the wireless device to use a particular repetition mapping for In-Phase/Quadrature-Phase, I/Q, symbol repetitions within an Orthogonal Frequency Division Multiplexing, OFDM, or Discrete Fourier Transform spread OFDM, DFT-s-OFDM, symbol of an uplink transmission, the I/Q symbol repetitions being for application of an intra data symbol Orthogonal Cover Code, OCC, to the I/Q symbol repetitions; or assists the wireless device with selection of a particular repetition mapping for I/Q symbol repetitions within an OFDM or DFT-s-OFDM symbol of an uplink transmission, the I/Q symbol repetitions being for application of an intra data symbol OCC to the I/Q symbol repetitions.

22. The base station of claim 21 wherein the information comprises an instruction or configuration that instructs the wireless device to use a particular one of two or more predefined repetition mappings.

23. The base station of claim 21 wherein the base station comprises:

processing circuitry configured to cause the base station to provide, to a wireless device, information that either:

instructs the wireless device to use a particular repetition mapping for I/Q symbol repetitions within an OFDM or DFT-s-OFDM symbol of an uplink transmission, the I/Q symbol repetitions being for application of an intra data symbol OCC to the I/Q symbol repetitions; or assists the wireless device with selection of a particular repetition mapping for I/Q symbol repetitions within an OFDM or DFT-s-OFDM symbol of an uplink transmission, the I/Q symbol repetitions being for application of an intra data symbol OCC to the I/Q symbol repetitions.

* * * * *